(12) United States Patent
Murayoshi

(10) Patent No.: US 12,722,222 B2
(45) Date of Patent: Sep. 1, 2026

(54) REDUCING MATERIAL FOR GAS PRESSURE WELDING AND GAS PRESSURE WELDING METHOD

(71) Applicant: Murayoshi Gas Pressure Welding Industry Co., Ltd., Okinawa (JP)

(72) Inventor: Seiyu Murayoshi, Okinawa (JP)

(73) Assignee: Murayoshi Gas Pressure Welding Industry Co., Ltd., Okinawa (JP)

( * ) Notice: Subject to any disclaimer, the term of this patent is extended or adjusted under 35 U.S.C. 154(b) by 0 days.

(21) Appl. No.: 18/876,640

(22) PCT Filed: Jun. 4, 2024

(86) PCT No.: PCT/JP2024/020329

§ 371 (c)(1),
(2) Date: Dec. 18, 2024

(87) PCT Pub. No.: WO2024/253078

PCT Pub. Date: Dec. 12, 2024

(65) Prior Publication Data

US 2025/0367753 A1 Dec. 4, 2025

(30) Foreign Application Priority Data

Jun. 9, 2023 (JP) ................................ 2023-095666
Nov. 17, 2023 (JP) ................................ 2023-195679

(51) Int. Cl.
*B23K 20/16* (2006.01)
*B23K 20/26* (2006.01)

(52) U.S. Cl.
CPC .............. *B23K 20/16* (2013.01); *B23K 20/26* (2013.01)

(58) Field of Classification Search
CPC ..................................................... B23K 20/16
See application file for complete search history.

(56) References Cited

U.S. PATENT DOCUMENTS

2023/0339041 A1* 10/2023 Murayoshi ............. B23K 20/26

FOREIGN PATENT DOCUMENTS

JP 56056792 A * 5/1981
JP 57181785 A * 11/1982
(Continued)

OTHER PUBLICATIONS

"International Search Report (Form PCT/ISA/210) of PCT/JP2024/020329", mailed on Jul. 9, 2024, with English translation thereof, pp. 1-4.

*Primary Examiner* — Keith Walker
*Assistant Examiner* — Carlos J Gamino
(74) *Attorney, Agent, or Firm* — JCIPRNET

(57) ABSTRACT

Provided is a reducing material for gas pressure welding that enables attachment of a reducing material for gas pressure welding onto a tip portion of a material to be pressure-welded in a state where a gap between tip surfaces of respective materials to be pressure-welded is narrow when the reducing material for gas pressure welding is attached onto the tip portion of the fixed material to be pressure-welded such as a steel material. A reducing material for gas pressure welding D1 includes a thermoplastic resin cap body 1*a* that can be externally fitted onto a tip portion on a pressure-welded side of a material to be pressure-welded, and the cap body 1*a* has a body portion 10 provided with a cut edge 120 in a circumferential direction with a predetermined thickness along a top plate 11 of the cap body 1*a*, having a width allowing the cut edge 120 to be fitted around the material to be pressure-welded, and provided with cut edges 122, 123 continuing from the cut edge 120 to a hem end portion in substantially at a right angle to the top plate 11 at the remaining thickness portion of the body portion 10 to form a fitting opening portion 12.

2 Claims, 12 Drawing Sheets

(56) References Cited

FOREIGN PATENT DOCUMENTS

| | | | | |
|---|---|---|---|---|
| JP | H0475735 | | | 3/1992 |
| JP | H0588789 | U | * | 12/1993 |
| JP | H09253893 | A | * | 9/1997 |
| JP | 2008111295 | A | * | 5/2008 |
| JP | 2010149142 | A | * | 7/2010 |
| JP | 2010155271 | A | * | 7/2010 |
| JP | 2011177780 | | | 9/2011 |
| JP | 2012148331 | | | 8/2012 |
| JP | 2017094349 | | | 6/2017 |

* cited by examiner

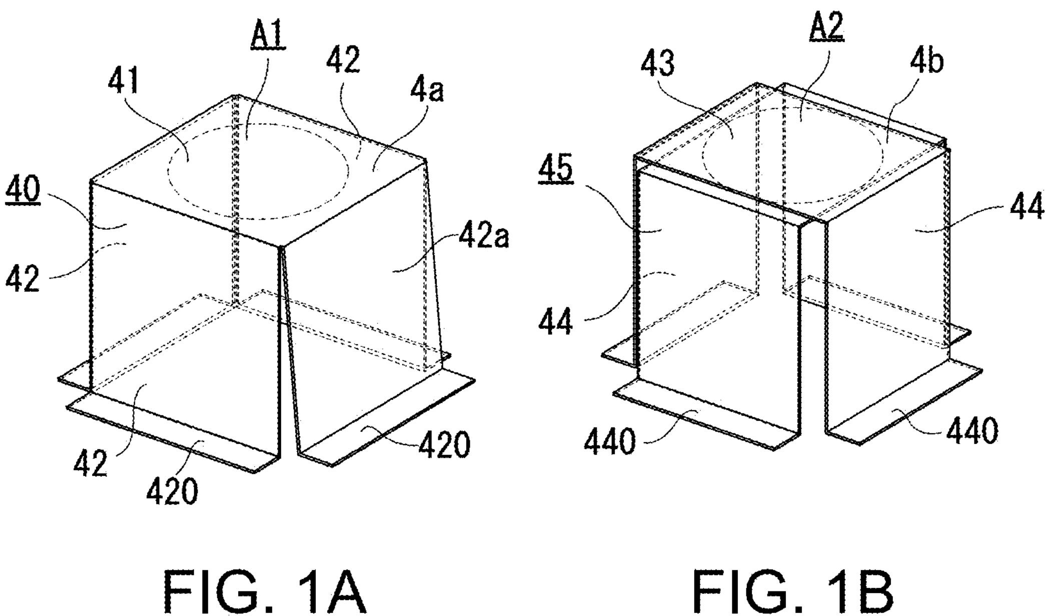
FIG. 1A
FIG. 1B
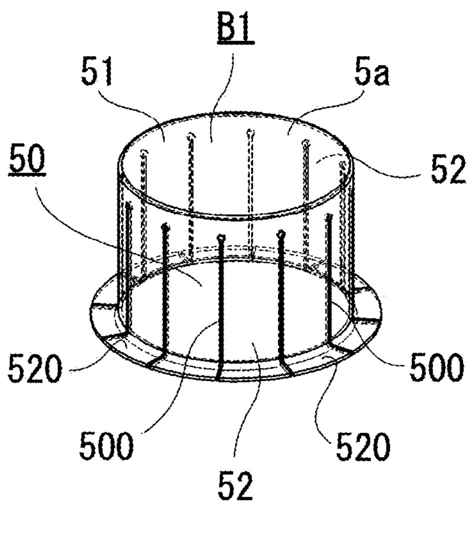
FIG. 2A
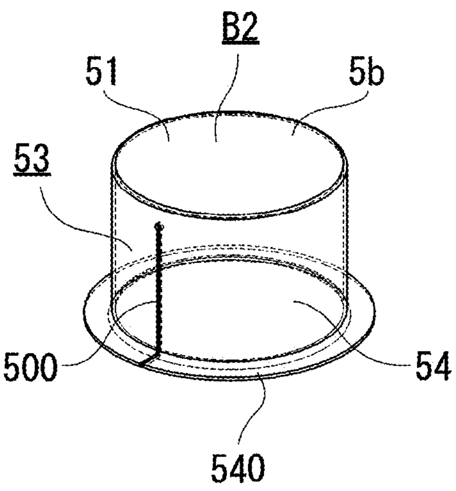
FIG. 2B

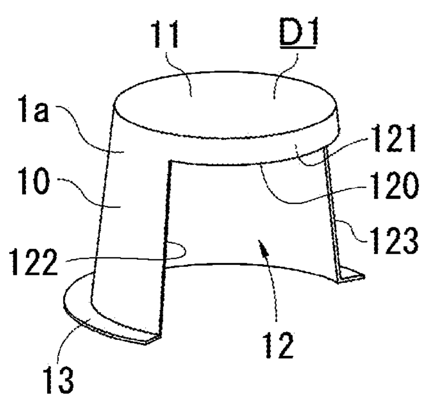
FIG. 11A
1a
D1
13
10
122
123
150°
FIG. 11B
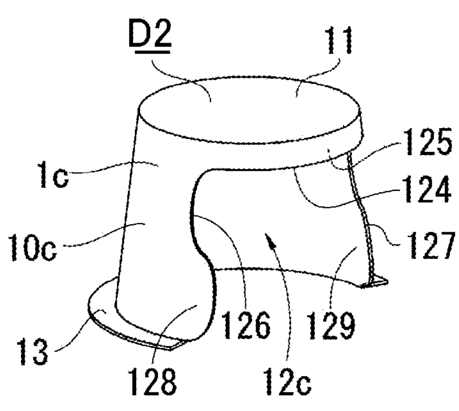
FIG. 11C
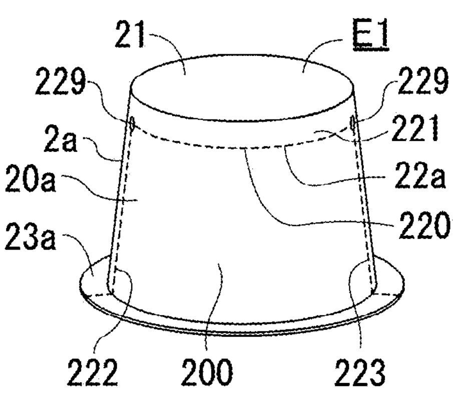
FIG. 12A
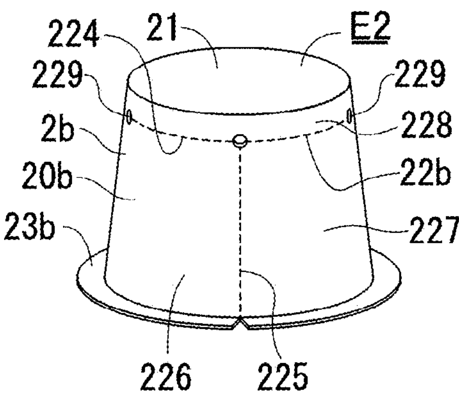
FIG. 12B

REDUCING MATERIAL FOR GAS PRESSURE WELDING AND GAS PRESSURE WELDING METHOD

CROSS-REFERENCE TO RELATED APPLICATION

This application is a 371 application of the International PCT application serial no. PCT/JP2024/020329, filed on Jun. 4, 2024, which claims the priority benefits of Japan Patent Application No. 2023-095666, filed on Jun. 9, 2023, and Japan Patent Application No. 2023-195679, filed on Nov. 17, 2023. The entirety of each of the above-mentioned patent applications is hereby incorporated by reference herein and made a part of this specification.

TECHNICAL FIELD

The present invention relates to a reducing material for gas pressure welding and a gas pressure welding method. Specifically, the present invention relates to a reducing material for gas pressure welding and a gas pressure welding method that enable attachment of a reducing material for gas pressure welding onto a tip portion of a material to be pressure-welded in a state where a gap between tip surfaces of respective materials to be pressure-welded is narrow when the reducing material for gas pressure welding is attached onto the tip portion of the material to be pressure-welded.

RELATED ART

The pressure welding of steel materials such as reinforcing bars involves bringing two steel materials arranged vertically or horizontally into contact with each other at their tip surfaces with a central axis in common, thereafter applying a predetermined pressure to the movable steel material. When the upper limit of pressure is reached, the periphery of the abutting part is heated with a flame fueled by a combustible gas. When the temperature of the heated portion reaches a temperature at which plastic deformation occurs, the pressure welded portion is deformed to be thick, forming a so-called bead, and the pressure welding is completed.

Further, in the pressure welding of steel materials, a reducing material for gas pressure welding is often used in order to achieve stronger pressure welding. The reducing material for gas pressure welding is used by being sandwiched between end surfaces to be joined or being placed in the vicinity of the end surfaces when two steel materials are disposed facing each other and subjected to gas pressure welding. Examples of the reducing material for gas pressure welding include “an annular body holding member incorporating an annular body for gas pressure welding” as shown in Patent Literature 1.

The annular body holding member includes: an annular body having substantially the same shape as an end surface, formed of substantially the same material as a steel material, and having a gas vent portion; a synthetic resin holding container having a protrusion having an annular body installation space in which the annular body is accommodated on a bottom surface side, and convex portions connected to the protrusion and to be attached in contact with an outer shape of the steel material; and a synthetic resin lid body capped on the annular body installation space of the holding container and stopping rotation of the annular body.

By having this configuration, the conventional annular body holding member stops the rotation of the annular body with the lid body in the holding container, thereby reliably setting the position of the gas vent portion at a predetermined position and extremely easily and safely performing the setting operation of the annular body to the end portion of the steel material.

CITATION LIST

Patent Literature

Patent Literature 1: Japanese Unexamined Patent Application Publication No. 2011-177780

SUMMARY OF INVENTION

Problem to Be Solved by Invention

However, the annular body holding member has the holding container formed of a thin synthetic resin sheet and is lightweight as a whole, so that the annular body holding member may be detached from the tip portion of the steel material and blown off by a sudden strong wind when a worker works outdoors. Alternatively, when a worker works around the abutting portion of the steel materials, the worker may accidentally remove the annular body holding member by catching his/her glove on it or the like.

Specifically, conventionally, when the annular body holding member is used to pressure-weld the steel materials, first, the gap between the tip surfaces of the fixed steel material and the movable steel material is set to be substantially equal to the height of the holding container of the annular body holding member so that the holding container can pass through the gap. When the annular body holding member is set, the annular body holding member is inserted from the gap between the tip surfaces of the respective steel materials, attached onto the tip portion of the fixed steel material, and in order to sandwich a circular top portion of the annular body holding member, the tip surface of the movable steel material is brought close to the tip surface of the fixed steel material by a hydraulic cylinder of a pressure welding machine.

However, if the wind blows strongly or the worker accidentally touches the annular body holding member at this time, the annular body holding member may come off the tip portion of the steel material, pass through the gap that is not yet narrow enough, and fall or be blown off. In this case, the movable steel material moves toward the fixed steel material even after the annular body holding member passes through the gap. Thus, even if an operation is performed to stop the steel material, in many cases, the tip surface thereof hits the tip surface of the fixed steel material, resulting in a state where there is no gap between the tip surfaces.

In order to attach the annular body holding member onto the tip portion of the fixed steel material again, it is necessary to return the movable steel material to its original position again from the position where the movable steel material is in contact with the tip surface of the fixed steel material, allow the annular body holding member to pass through the gap between the tip surfaces of the respective steel materials, and temporarily stop the steel material at that position. The work of securing the gap between the tip surfaces of the respective steel materials is very time-consuming and troublesome work, and it is even more so especially when the gap is large and the workload increases.

The present invention has been made in view of the foregoing point, and an object thereof is to provide a reducing material for gas pressure welding and a gas pressure welding method that enable attachment of a reducing material for gas pressure welding (corresponding to the annular body holding member) onto a tip portion of a material to be pressure-welded (corresponding to the steel material) in a state where a gap between tip surfaces of respective materials to be pressure-welded is narrow when the reducing material for gas pressure welding is attached onto the tip portion of the material to be pressure-welded.

Means for Solving Problem

[1] In order to achieve the foregoing object, a reducing material for gas pressure welding of the present invention includes a cap body that can be externally fitted onto a tip portion of a material to be pressure-welded, wherein the cap body has a body portion formed with an opening/closing portion or a fitting opening portion that can be fitted around the material to be pressure-welded from a side surface so that a top portion of the cap body comes in contact with a tip surface of the material to be pressure-welded.

The reducing material for gas pressure welding of the present invention includes the cap body, and the cap body can be externally fitted onto the tip portion of the material to be pressure-welded such as the steel material. By appropriately setting the dimensions of the cap body, the state of the cap body can be maintained even after the attachment. Further, the body portion of the cap body is formed with the opening/closing portion or the fitting opening portion for fitting the reducing material for gas pressure welding around the material to be pressure-welded from the side surface.

Here, when the opening/closing portion that can be fitted around the material to be pressure-welded from the side surface is formed in the body portion of the cap body, the opening/closing portion can be opened to provide the fitting opening portion for fitting the cap body around the material to be pressure-welded from the side surface, and fitting can be easily performed by aligning the fitting opening portion with the tip portion of the material to be pressure-welded in a state where the gap between the tip surfaces of the respective materials to be pressure-welded is narrow. Further, when the opening/closing portion is closed after the fitting, the reducing material for gas pressure welding can be fixed to the material to be pressure-welded.

Further, the reducing material for gas pressure welding (when the opening/closing portion is formed) of the present invention may have a configuration in which the body portion has a required number of side plates provided in a circumferential direction of the top portion and forming the body portion and a predetermined side plate of the side plates can deform independently of the other side plates.

In this case, the predetermined independently deformable side plate of the required number of side plates forming the body portion is deformed forward or sideways and opened, and in this state, the fitting opening portion for fitting around the material to be pressure-welded from the side surface can be provided to the cap body. As a result, the fitting opening portion can be aligned with the tip portion of the material to be pressure-welded and laterally fitted in the state where the gap between the tip surfaces of the respective materials to be pressure-welded is narrow.

Further, by pressing the predetermined side plate against the material to be pressure-welded and deforming the predetermined side plate toward the back side, the fitting opening portion can be aligned with the tip portion of the material to be pressure-welded and laterally fitted. Note that when the side plate is closed after the fitting, the reducing material for gas pressure welding can be fixed to the material to be pressure-welded.

Further, the reducing material for gas pressure welding (when the opening/closing portion is formed) of the present invention may have a configuration in which the body portion has four body leg portions formed in a cross shape on the same plane by sheets and bent in the same direction at substantially the same length and a predetermined body leg portion of the body leg portions formed in the circumferential direction of the top portion can be deformed.

In this case, the predetermined deformable body leg portion of the four body leg portions formed in the cross shape on the same plane by sheets and forming the body portion is deformed forward or sideways and opened, and in this state, the fitting opening portion for fitting around the material to be pressure-welded from the side surface can be provided to the cap body. As a result, the fitting opening portion can be aligned with the tip portion of the material to be pressure-welded and laterally fitted in the state where the gap between the tip surfaces of the respective materials to be pressure-welded is narrow.

Further, by pressing the predetermined body leg portion against the material to be pressure-welded and deforming the predetermined body leg portion toward the back side, the fitting opening portion can be aligned with the tip portion of the material to be pressure-welded and laterally fitted. Note that when the body leg portion is closed after the fitting, the reducing material for gas pressure welding can be fixed to the material to be pressure-welded.

Further, the reducing material for gas pressure welding (when the opening/closing portion is formed) of the present invention may have a configuration in which the body portion includes a required number of body leg portions separated by cut portions in the circumferential direction of the top portion and forming the body portion and the body leg portions can be deformed.

In this case, the required number of body leg portions separated by the cut portions in the circumferential direction of the top portion and forming the body portion is swung toward the front or the back, deformed, and opened, and in this state, the fitting opening portion for fitting around the material to be pressure-welded from the side surface can be provided to the cap body. As a result, the fitting opening portion can be aligned with the tip portion of the material to be pressure-welded and laterally fitted in the state where the gap between the tip surfaces of the respective materials to be pressure-welded is narrow.

Further, by pressing the predetermined body leg portion against the material to be pressure-welded and deforming the predetermined body leg portion toward the back side, the fitting opening portion can be aligned with the tip portion of the material to be pressure-welded and laterally fitted. Note that when the body leg portion is closed after the fitting, the reducing material for gas pressure welding can be fixed to the material to be pressure-welded.

Further, when the body portion of the cap body is formed with the fitting opening portion that can be fitted around the material to be pressure-welded from the side surface, the reducing material for gas pressure welding can be fitted around the material to be pressure-welded and attached even when the gap between the tip portions of the materials to be pressure-welded is narrow. Note that the reducing material for gas pressure welding can be attached onto the tip portion of the material to be pressure-welded and used as a reducing material even when the gap between the tip portions of the materials to be pressure-welded is wide.

Further, the reducing material for gas pressure welding (when the fitting opening portion is formed) of the present invention may also have a configuration in which the fitting opening portion is formed by providing a cut edge in the circumferential direction with a predetermined thickness along the top portion of the cap body and a width allowing the fitting opening portion to be fitted around the material to be pressure-welded from the side surface and by providing cut edges continuing from the cut edge up to a hem end portion at a predetermined angle with respect to the top portion or in a predetermined shape at the remaining thickness portion of the body portion.

In this case, the reducing material for gas pressure welding can be attached onto the tip portion of the material to be pressure-welded by inserting the thickness portion of the top portion into the gap between the tip surfaces of the respective materials to be pressure-welded and fitting the fitting opening portion formed by the cut edges and continuing from the portion along the top portion to the hem end portion around the side surface of the tip portion of the material to be pressure-welded as long as the tip surfaces on the pressure welding side (pressure welding surfaces) of the materials to be pressure-welded are separated to at least a degree equal to the thickness of the top portion of the cap body. At this time, the reducing material for gas pressure welding can be attached simply by widening the gap to a gap having a width equal to the thickness of the top portion of the cap body which is significantly thinner than the thickness of the entire cap body.

[2] In order to achieve the foregoing object, a reducing material for gas pressure welding of the present invention includes a cap body that can be externally fitted onto a tip portion of a material to be pressure-welded, wherein the cap body has a top portion that comes in contact with a tip surface of the material to be pressure-welded and a required number of body leg portions provided in a circumferential direction of the top portion, and an interval between at least a pair of the body leg portions adjacent to each other is formed to be substantially equal to a diameter of the material to be pressure-welded or larger than the diameter of the material to be pressure-welded.

The reducing material for gas pressure welding of the present invention includes the cap body, and the cap body can be externally fitted onto the tip portion of the material to be pressure-welded. In the top portion of the cap body and the required number of body leg portions provided in the circumferential direction of the top portion, the interval between at least the pair of body leg portions adjacent to each other is formed to be substantially equal to the diameter of the material to be pressure-welded or larger than the diameter of the material to be pressure-welded, and thus, a space between the body leg portions serves as a fitting opening portion for fitting around the material to be pressure-welded from the side surface.

As a result, the fitting opening portion can be aligned with the tip portion of the material to be pressure-welded and laterally fitted in a state where the gap between the tip surfaces of the respective materials to be pressure-welded is narrow. Note that the fitting opening portion does not need to be opened or closed at the time of or after the attachment of the reducing material for gas pressure welding, so that the troublesome aspect of the work is alleviated and the work can be easily performed.

[3] In order to achieve the foregoing object, a reducing material for gas pressure welding of the present invention includes a cap body that can be externally fitted onto a tip portion of a material to be pressure-welded, wherein the cap body has a body portion formed so as to be fittable around the material to be pressure-welded from a side surface by deforming a shape of the body portion so that a top portion of the cap body comes in contact with a tip surface of the material to be pressure-welded.

The reducing material for gas pressure welding of the present invention includes the cap body, and the cap body can be externally fitted onto the tip portion of the material to be pressure-welded. That is, the shape of the body portion of the cap body is deformed, so that the reducing material for gas pressure welding can be fitted around the material to be pressure-welded from the side surface by inserting and fitting the top portion into the gap between the tip surfaces of the materials to be pressure-welded while deforming the body portion.

The portion deformed in the body portion at the time of fitting can be returned to its original shape after the fitting to fix the reducing material for gas pressure welding such that the tip surface is surrounded with the body portion, or may be folded into the gap while keeping it deformed. In this case, the folded portion can be preferably used as a reducing material.

[4] In order to achieve the foregoing object, a reducing material for gas pressure welding of the present invention includes a cap body that can be externally fitted onto a tip portion of a material to be pressure-welded, wherein the cap body has a body portion provided with a separable weakening line so as to be able to form a fitting opening portion that can be fitted around the material to be pressure-welded from a side surface.

The cap body can be externally fitted onto the tip portion on the pressure welding side of the material to be pressure-welded. If the dimensions of the cap body are appropriately set, the state of the cap body can be maintained even after the attachment.

Further, the body portion of the cap body is provided with the separable weakening line so as to be able to form the fitting opening portion that can be fitted around the material to be pressure-welded from the side surface. Therefore, the fitting opening portion can be formed by tearing along the weakening line and removing an unnecessary part. As a result, the reducing material for gas pressure welding has the fitting opening portion in the body portion unlike the original form, so that it can achieve the same action and effect as the reducing material for gas pressure welding (when the fitting opening portion is formed) described in [1] above.

The reducing material for gas pressure welding may also have a configuration in which the weakening line is provided in the circumferential direction with a predetermined thickness along the top portion of the cap body and a width allowing the weakening line to be fitted around the material to be pressure-welded from the side surface, and is also provided continuing therefrom up to a hem end portion at a predetermined angle with respect to the top portion or in a predetermined shape at the remaining thickness portion of the body portion.

In this case, the weakening line is provided so as to be able to form a fitting opening portion cut out in the circumferential direction with a predetermined thickness along the top portion of the cap body and a width allowing the fitting opening portion to be fitted around the material to be pressure-welded, and also cut out continuing therefrom to the hem end portion at a predetermined angle with respect to the top portion or in a predetermined shape at the remaining thickness portion of the body portion.

As a result, the fitting opening portion can be formed from the portion along the top portion to the hem end portion of the body portion by separating the portion of the predetermined thickness along the top portion of the weakening line and the portion of the remaining thickness of the body portion of the weakening line and removing the unnecessary part. As a result, the reducing material for gas pressure welding has the fitting opening portion in the body portion unlike the original form, so that it can achieve the same action and effect as the reducing material for gas pressure welding (when the fitting opening portion is formed) described in [1] above.

The reducing material for gas pressure welding may also have a configuration in which the weakening line is provided in a substantially T shape running in the circumferential direction with a predetermined thickness substantially parallel to the top portion of the cap body, having a width allowing the weakening line to be fitted around the material to be pressure-welded from the side surface, connecting to an intermediate portion thereof, and capable of forming an opening/closing port portion allowing the body portion to be opened and closed by separating along the weakening line up to the hem end portion.

In this case, the weakening line is provided in the substantially T shape running in the circumferential direction with a predetermined thickness substantially parallel to the top portion of the cap body, having a width allowing the weakening line to be fitted around the material to be pressure-welded from the side surface, connecting to the intermediate portion thereof, and capable of forming the opening/closing port portion allowing the body portion to be opened and closed by separating along the weakening line up to the hem end portion.

As a result, in the reducing material for gas pressure welding, the opening/closing port portion can be formed from the portion along the top portion to the hem end portion of the body portion unlike the original form by separating the portion of the predetermined thickness parallel to the top portion of the weakening line and the portion connecting to the intermediate portion thereof and being separable up to the hem end portion of the weakening line and opening the formed two opening/closing pieces outward or inward.

In a gas pressure welding method using the reducing material for gas pressure welding, the opening/closing pieces are opened to form an opening/closing port portion in the cap body. The thickness portion of the top portion is then inserted into the gap between the tip surfaces of the materials to be pressure-welded. Accordingly, the opening/closing port portion continuing from the portion along the top portion to the hem end portion can be fitted around the side surface of the tip portion of the fixed material to be pressure-welded, so that the reducing material for gas pressure welding can be attached by dropping the top portion onto the tip portion of the material to be pressure-welded.

The reducing material for gas pressure welding may be configured to include a second cap body that can be externally fitted onto the tip portion of the material to be pressure-welded and the second cap body may be configured to be stacked on the cap body with its body portion closing at least a part of the fitting opening portion.

In this case, the reducing material for gas pressure welding includes the second cap body that can be externally fitted onto the tip portion of the material to be pressure-welded and the second cap body is structured to be stacked on the cap body with its body portion closing at least a part of the fitting opening portion.

First, the reducing material for gas pressure welding is not used in its double structure if the gap between the tip surfaces of the materials to be pressure-welded is narrower than the height of the cap body. The reducing material for gas pressure welding can be placed in the double structure as it is when placed on the tip of the material to be pressure-welded before the top portion of the cap body of the reducing material for gas pressure welding is sandwiched between the tip surfaces of the respective materials to be pressure-welded, that is, when the gap is wide open. As a result, the reducing material for gas pressure welding is less likely to come off the tip portion of the material to be pressure-welded due to the action of the deep body portion of the second cap body even if some wind blows before the top portion of the cap body is sandwiched.

If the reducing material for gas pressure welding does not come off by the time the top portion of the cap body of the reducing material for gas pressure welding is sandwiched between the tip surfaces of the respective materials to be pressure-welded, the sandwiched double-structured reducing material for gas pressure welding can be used as it is as a reducing material. Note that the reducing material for gas pressure welding also has a double layer at the top portion of the cap body, so that a favorable influence on the effect as a reducing material can be expected.

Further, if the reducing material for gas pressure welding comes off by the time the top portion of the cap body of the reducing material for gas pressure welding is sandwiched between the tip surfaces of the respective materials to be pressure-welded, the reducing material for gas pressure welding having the fitting opening portion in the cap body is removed from the second cap body of the detached reducing material for gas pressure welding, and only the reducing material for gas pressure welding is used as the reducing material. The action at that time is the same as that of the reducing material for gas pressure welding (when the fitting opening portion is formed) described in [1] above, so that it is incorporated herein and the description thereof is omitted.

Note that the second cap body can be used as a single reducing material for gas pressure welding even after the reducing material for gas pressure welding having the fitting opening portion in the cap body is removed, so that the second cap body can be reused, for example, as a normal bottomed cylindrical (in terms of posture, topped cylindrical) reducing material for gas pressure welding or as a component of this double-structured reducing material for gas pressure welding.

The reducing material for gas pressure welding may also be configured to include a ring body provided on the top portion of the cap body and made of resin, metal, or graphite, which melts at a higher temperature than a melting temperature of the material constituting the top portion.

In this case, the ring body provided on the top portion of the cap body and made of resin, metal, or graphite, which melts at a higher temperature than a melting temperature of the material constituting the top portion is included, so that the top portion of the cap body is first melted and burned by being heated by the flame of the gas in the pressure welding.

The top portion is then melted, burned, and further vaporized in a very short time within a slight gap sandwiched between the tip surfaces of the materials to be pressure-welded inside the ring body not yet melted. Due to the rapid increase in volume, the air in the gap inside the ring body is pushed out to the outside at a high pressure, and oxygen in the air is combined with carbon of the polymer to become carbon dioxide gas, and oxidation on the pressure-welded surfaces is suppressed.

Further, while the ring body is not melted, the intrusion of the air into the gap inside the ring body is blocked. Combined therewith, oxidation within the gap is suppressed, and the formation of an oxide film on the tip surfaces on the pressure-welded side of the materials to be pressure-welded can be suppressed.

As just described, according to the reducing material for gas pressure welding, in the case of using natural gas, propane gas, hydrogen gas, or the like, which is inferior in thermal power to acetylene gas, in performing gas pressure welding of the materials to be pressure-welded, the formation of residue such as an oxide film and a metal residue on the pressure welded part can be suppressed even if heating is performed with a standard flame from the initial stage of heating so as to obtain sufficient thermal power, so that pressure welding with sufficient strength can be performed.

Note that the reducing material for gas pressure welding of the present invention may also have a configuration in which a hole penetrating in the front and back direction is formed at a predetermined place of the body portion.

In this case, by forming the hole penetrating in the front and back direction at the predetermined place of the body portion, the occurrence of sagging when the cap body is heated and contamination due to scorching and sagging can be further reduced accordingly. Therefore, post-processing such as finishing (cleaning) of the pressure welded part can be easily performed.

Further, the reducing material for gas pressure welding of the present invention may also have a configuration in which an engagement portion projecting inward is formed at a predetermined place of the body portion.

In this case, by forming the engagement portion projecting inward at the predetermined place of the body portion, the fixing force of the reducing material for gas pressure welding with respect to the material to be pressure-welded becomes strong when the reducing material for gas pressure welding is attached to the material to be pressure-welded, so that displacement is less likely to occur and the inconvenience that the reducing material for gas pressure welding is displaced or blown off by wind after the attachment can be reduced.

[5] In order to achieve the foregoing object, a gas pressure welding method of the present invention includes the steps of attaching a reducing material for gas pressure welding having a cap body with a height greater than a predetermined gap to one material to be pressure-welded whose tip surface is disposed facing a tip surface of an other material to be pressure-welded with the predetermined gap therebetween by fitting the reducing material for gas pressure welding from a side surface of the one material to be pressure-welded so that a top portion of the cap body comes in contact with the tip surface of the one material to be pressure-welded; and with the cap body attached, sandwiching the top portion between the tip surfaces of the one material to be pressure-welded and the other material to be pressure-welded and heating them.

According to the gas pressure welding method of the present invention, the cap body having a height greater than the predetermined gap is fitted around one material to be pressure-welded disposed facing the tip surface of the other material to be pressure-welded with the predetermined gap therebetween from the side surface of one material to be pressure-welded. Therefore, even if the gap is narrower than the height of the cap body, the cap body can be externally fitted onto the tip portion of one material to be pressure-welded and attached.

As a result, for example, even when the reducing material for gas pressure welding is attached again (reattached) into the gap between the tip surfaces of the respective materials to be pressure-welded, there is no need to make complicated adjustment by greatly widening the gap between the tip surfaces of the respective materials to be pressure-welded, and the reducing material for gas pressure welding can be attached from the side surface of the material to be pressure-welded in a state where the gap is narrow, and the complexity of the work can be greatly reduced. As a result, the gas pressure welding can be easily performed.

Then, by butting and heating the tip surfaces of one material to be pressure-welded and the other material to be pressure-welded, the pressure welding can be firmly performed while preventing the formation of an oxide film on the tip surfaces. That is, in a slight gap sandwiched between the tip surfaces of the respective materials to be pressure-welded, the top portion of the cap body is melted, burned, and further vaporized to rapidly increase in volume in a very short time, whereby the air is pushed out to the outside at a high pressure, and oxygen in the air is combined with carbon of the polymer to become carbon dioxide gas, and oxidation on the pressure-welded surfaces is suppressed.

The gas pressure welding method may include a step of forming a fitting opening portion in a body portion of the cap body prior to the attaching step in order to allow the cap body to be fitted from the side surface of one material to be pressure-welded.

In this case, the fitting opening portion is formed in the body portion of the cap body prior to the attaching step in order to allow the cap body to be fitted from the side surface of one material to be pressure-welded, so that a reducing material for gas pressure welding having a cap body provided with a fitting opening portion adapted to the shape of the material to be pressure-welded can be prepared in advance at the time of performing the pressure welding. Therefore, the pressure welding can be efficiently performed.

Effects of Invention

The present invention can provide a reducing material for gas pressure welding and a gas pressure welding method that enable attachment of a reducing material for gas pressure welding onto a tip portion of a material to be pressure-welded while a gap between tip surfaces of respective materials to be pressure-welded is narrow when the reducing material for gas pressure welding is attached onto the tip portion of the material to be pressure-welded.

BRIEF DESCRIPTION OF DRAWINGS

FIG. 1A and FIG. 1B are explanatory diagrams showing embodiments of type A of a reducing material for gas pressure welding according to the present invention.

FIG. 2A and FIG. 2B are explanatory diagrams showing embodiments of type B of the reducing material for gas pressure welding according to the present invention.

FIG. 11A to FIG. 11C are explanatory diagrams showing embodiments of type D of the reducing material for gas pressure welding according to the present invention.

FIG. 12A and FIG. 12B are explanatory diagrams showing embodiments of type E of the reducing material for gas pressure welding according to the present invention.

FIG. 17A and FIG. 17B are explanatory diagrams showing a modification of the reducing material for gas pressure welding, in which FIG. 17A is a perspective view of the reducing material for gas pressure welding and FIG. 17B is a cross-sectional view taken along line A-A of the reducing material for gas pressure welding.

DESCRIPTION OF EMBODIMENTS

Figure 3A:
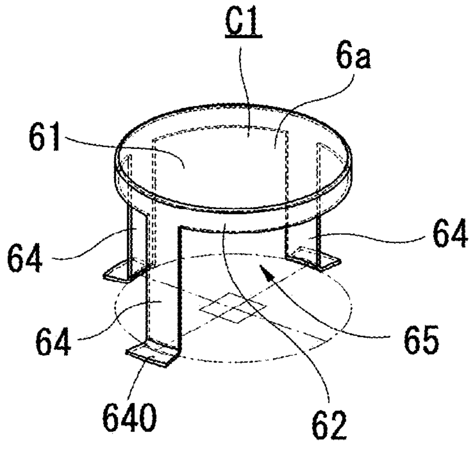
FIG. 3A and FIG. 3B are explanatory diagrams showing embodiments of type C of the reducing material for gas pressure welding according to the present invention.

First, embodiments of the present invention will be described in detail with reference to FIG. 1 to FIG. 10. In the following description of reducing materials for gas pressure welding, they will be divided into three types (A, B, C) and explained. Type A is a reducing material for gas pressure welding having a substantially bottomed box shape, Type B is a reducing material for gas pressure welding having a bottomed cylindrical shape in which a body portion is cut and divided in a circumferential direction by cuts, and Type C is a reducing material for gas pressure welding provided with a plurality of body legs in a circumferential direction of a top portion.

(Type A)

A reducing material for gas pressure welding A1 shown in FIG. 1A has a cap body 4*a*. The cap body 4*a* is made of a sheet made of polystyrene resin, which is a thermoplastic resin. The cap body 4*a* has a square top plate 41 on its top portion, and rectangular side plates of the same size constituting a body portion 40 are connected to four sides of the top plate 41.

Of the side plates, side plates 42 attached to three sides of the top plate 41 are connected to each other at side portions and integrated in the circumferential direction. A side plate 42*a* attached to the other side of the top plate 41 can deform and swing around an attachment edge (reference sign omitted). The side plates 42, 42*a* each have a hem end portion bent at a substantially right angle with a predetermined width to form a flange portion 420.

In the reducing material for gas pressure welding A1, a part of the body portion 40 can be opened and closed by swinging of the side plate 42*a*, and regardless of whether the side plate 42*a* expands outward or retracts inward, a fitting opening portion (reference sign omitted) for fitting around a material to be pressure-welded from a side surface can be formed.

A reducing material for gas pressure welding A2 shown in FIG. 1B has a cap body 4*b*. The cap body 4*b* is made of a sheet made of polystyrene resin, which is a thermoplastic resin. The cap body 4*b* is formed in a shape having a body portion 45 composed of four body leg portions 44 provided in the circumferential direction of a quadrangular top plate 43 by overlapping two rectangular sheets of the same size at a central portion in the length direction, integrating the sheets in a cross shape on the same plane, and further bending the sheets at right angles at the same length in the same direction.

Each of the body leg portions 44 forming the body portion 45 can deform and swing. By swinging each body leg portion 44 outward or inward, a fitting opening portion for fitting around the material to be pressure-welded from the side surface can be provided on each of four sides in the circumferential direction of the cap body 4*b*. Each body leg portion 44 has a hem end portion bent at a substantially right angle with a predetermined width to form a flange portion 440.

(Action)

Here, with reference to FIG. 1B and FIG. 4, a gas pressure welding method using the reducing material for gas pressure welding A2, which is one of Type A, and its action will be described.

The cap body 4*b* of the reducing material for gas pressure welding A2 can be externally fitted onto a tip portion on a pressure-welded side (pressure-welded surface 910 side) of a material to be pressure-welded 91 such as a steel material. The cap body 4*b* is made of thermoplastic resin and has predetermined shape retainability and deformability (flexibility, etc.). Therefore, the cap body 4*b* can be easily attached onto the tip portion of the material to be pressure-welded 91 by external fitting and can maintain the state even after the attachment.

Note that the cap body can also be formed of another material such as graphite (the same applies to the following reducing materials for gas pressure welding A2, A3, A4, A5, reducing materials for gas pressure welding B1, B2, B3, reducing materials for gas pressure welding C1, C2, reducing materials for gas pressure welding D1, D2, reducing materials for gas pressure welding E1, E2, and a reducing material for gas pressure welding F.).

Further, the material to be pressure-welded 91 (and 92 to be described later) is made of a steel material such as a deformed bar or a round steel bar. For example, in addition to a deformed steel bar (SD295A, SD295B, SD345, SD390, SD490), a round steel bar (SR235, SR295), or a high-strength reinforcing bar (USD385A, USD385B, USD980) defined by steel bars for reinforced concrete (JISG3112), a stainless steel reinforcing bar (SUS316, SUS304, etc.) with enhanced durability and corrosion resistance can also be adopted.

When performing gas pressure welding of the materials to be pressure-welded 91, 92, first, the fixed material to be pressure-welded 91 is held at a predetermined height in a vertically erected state by a fixed clamp (not shown). Further, the movable material to be pressure-welded 92 is held in a vertically erected state by a movable clamp (not shown). The materials to be pressure-welded 91, 92 are adjusted so that their center lines are on the same straight line, and pressure-welded surfaces 910, 920 of the materials to be pressure-welded 91, 92 are set at an appropriate interval. Note that the pressure welding may be performed with the materials to be pressure-welded 91, 92 held in the horizontal direction.

In the cap body 4*b* of the reducing material for gas pressure welding A2, the body leg portion 44 close to the material to be pressure-welded 91 is moved inward (or outward in some cases) to open the fitting opening portion at the time of attachment. As long as the pressure-welded surfaces 910, 920 of the materials to be pressure-welded 91, 92 are separated to at least a degree equal to the thickness of the top plate 43 of the cap body 4*b*, the reducing material for gas pressure welding A2 can be attached onto the tip portion of the fixed material to be pressure-welded 91.

That is, first, the thickness portion of the top plate 43 is horizontally inserted into a gap 900 between the pressure-welded surfaces 910, 920 of the materials to be pressure-welded 91, 92. Note that the top plate 43 may be tilted and inserted in the tilting direction instead of the horizontal direction. Along with this, the fitting opening portion is fitted around a side surface of the tip portion of the fixed material to be pressure-welded 91. Thus, the reducing material for gas pressure welding A2 can be attached onto the tip portion of the material to be pressure-welded 91 by aligning the top plate 43 with the pressure-welded surface 910 (see FIG. 4).

With the reducing material for gas pressure welding A2 attached as described above, the material to be pressure-welded 92 descends and the top plate 43 of the cap body 4*b* is sandwiched between the pressure-welded surfaces 910, 920.

The top plate 43 is then heated by the flame of the gas together with the materials to be pressure-welded 91, 92, whereby the pressure welding can be firmly performed while preventing the formation of an oxide film on the pressure-welded surfaces 910, 920.

That is, in a slight gap sandwiched between the pressure-welded surfaces 910, 920 of the respective materials to be pressure-welded 91, 92, the top plate 43 of the cap body 4*b* made of thermoplastic resin is melted, burned, and further vaporized to rapidly increase in volume in a very short time, whereby the air is pushed out to the outside at a high pressure, and oxygen in the air is combined with carbon of the polymer to become carbon dioxide gas, and oxidation on the pressure-welded surfaces is suppressed.

Figure 4:
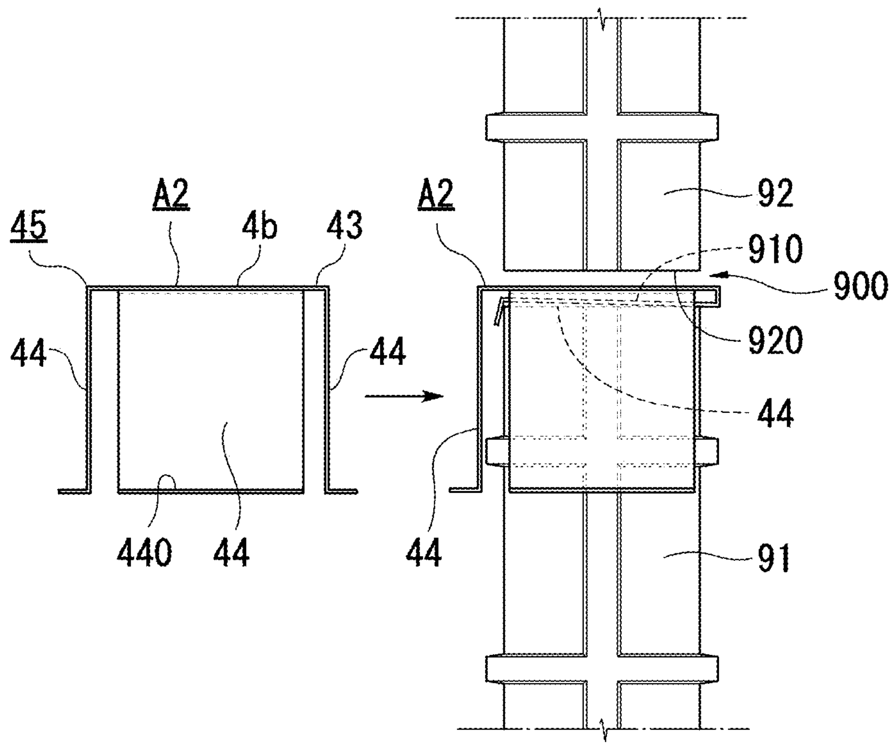
FIG. 4 is an explanatory diagram showing a method of attaching one of the embodiments of type A of the reducing material for gas pressure welding.

Further, according to the reducing material for gas pressure welding A2, for example, when the reducing material for gas pressure welding A2 comes off before closing the gap between the pressure-welded surfaces 910, 920 of the respective materials to be pressure-welded, the reducing material for gas pressure welding A2 needs to be attached again, but even in that case, there is no need to make complicated adjustment by greatly widening the gap between the pressure-welded surfaces 910, 920 of the materials to be pressure-welded 91, 92 (see FIG. 4).

In the case of a reducing material for gas pressure welding where the fitting opening portion is not provided in the cap body, the pressure-welded surface 920 needs to be adjusted higher than the pressure-welded surface 910 shown in FIG. 4 by h in order to insert the reducing material for gas pressure welding into the gap (see FIG. 14B described later).

The work of securing the gap between the pressure-welded surfaces 910, 920 of the materials to be pressure-welded 91, 92 is very time-consuming and troublesome work, and the workload is particularly large.

On the contrary, in the reducing material for gas pressure welding A2, the reducing material for gas pressure welding A2 can be attached as described above simply by widening the gap to a gap having a width equal to the thickness of the top plate 43 of the cap body 4*b* which is significantly thinner than the thickness of the entire cap body 4*b*.

As a result, the complexity of the work can be greatly reduced, and consequently, the gas pressure welding can be easily performed. When attached to the material to be pressure-welded 91, the reducing material for gas pressure welding A2 sandwiches the material to be pressure-welded 91 with the side plates 42 on both sides. This is excellent in holding force that prevents the reducing material for gas pressure welding A2 from coming off.

In the case of the reducing material for gas pressure welding A1, the fitting opening portion can be formed by opening the side plate 42*a* toward the front or the back and laterally fitted, or by pressing the part of the side plate 42*a* against the reinforcing bar, the side plate 42 is pushed toward the back to form the fitting opening portion and the fitting opening portion can be fitted from the lateral direction.

(Type B)

A reducing material for gas pressure welding B1 shown in FIG. 2A has a cap body 5*a*. The cap body 5*a* is made of a sheet made of polystyrene resin, which is a thermoplastic resin. The cap body 5*a* has a circular top plate 51, around which a substantially cylindrical body portion 50 is provided at the same height over the entire circumference.

Further, the body portion 50 is formed with a required number of body leg portions 52 by making cuts 500 in the longitudinal direction while partially leaving the origin end portions with a predetermined width spacing over the entire circumference. Each of the body leg portions 52 has a tip portion provided with a flange portion 520. As a result, each of the body leg portions 52 can deform independently.

(Action)

Here, with reference to FIG. 2B and FIG. 5, a gas pressure welding method using the reducing material for gas pressure welding B1, which is one of Type B, and its action will be described.

The cap body 5*a* of the reducing material for gas pressure welding B1 can be externally fitted onto the tip portion on the pressure-welded side (pressure-welded surface 910 side) of the material to be pressure-welded 91 such as a steel material. The cap body 5*a* is made of thermoplastic resin and has predetermined shape retainability and deformability. Therefore, the cap body 5*a* can be easily attached onto the tip portion of the material to be pressure-welded 91 by external fitting and can maintain the state even after the attachment.

In the cap body 5*a* of the reducing material for gas pressure welding B1, at the time of attachment, the body leg portions 52 close to the material to be pressure-welded 91 are pressed against the material to be pressure-welded 91 and deformed inward to open the fitting opening portion (Note that the body leg portions 52 may be manually operated.). As long as the pressure-welded surfaces 910, 920 of the materials to be pressure-welded 91, 92 are separated to at least a degree slightly larger than the thickness of the top plate 51 of the cap body 5*a*, the reducing material for gas pressure welding B1 can be attached onto the tip portion of the fixed material to be pressure-welded 91.

The thickness portion of the top plate 51 is then horizontally inserted into the gap 900 between the pressure-welded surfaces 910, 920 of the materials to be pressure-welded 91, 92. Along with this, the fitting opening portion is fitted around the side surface of the tip portion of the fixed material to be pressure-welded 91. Thus, the reducing material for gas pressure welding B1 can be attached onto the tip portion of the material to be pressure-welded 91 by aligning the top plate 51 with the pressure-welded surface 910 (see FIG. 5).

With the reducing material for gas pressure welding B1 attached as described above, the material to be pressure-welded 92 descends and the top plate 51 of the cap body 5*a* is sandwiched between the pressure-welded surfaces 910, 920.

The top plate 51 is then heated by the flame of the gas together with the materials to be pressure-welded 91, 92, whereby the pressure welding of the respective materials to be pressure-welded 91, 92 can be firmly performed as in the case of using the reducing material for gas pressure welding A2 described above while preventing the formation of an oxide film on the pressure-welded surfaces 910, 920.

Figure 5:
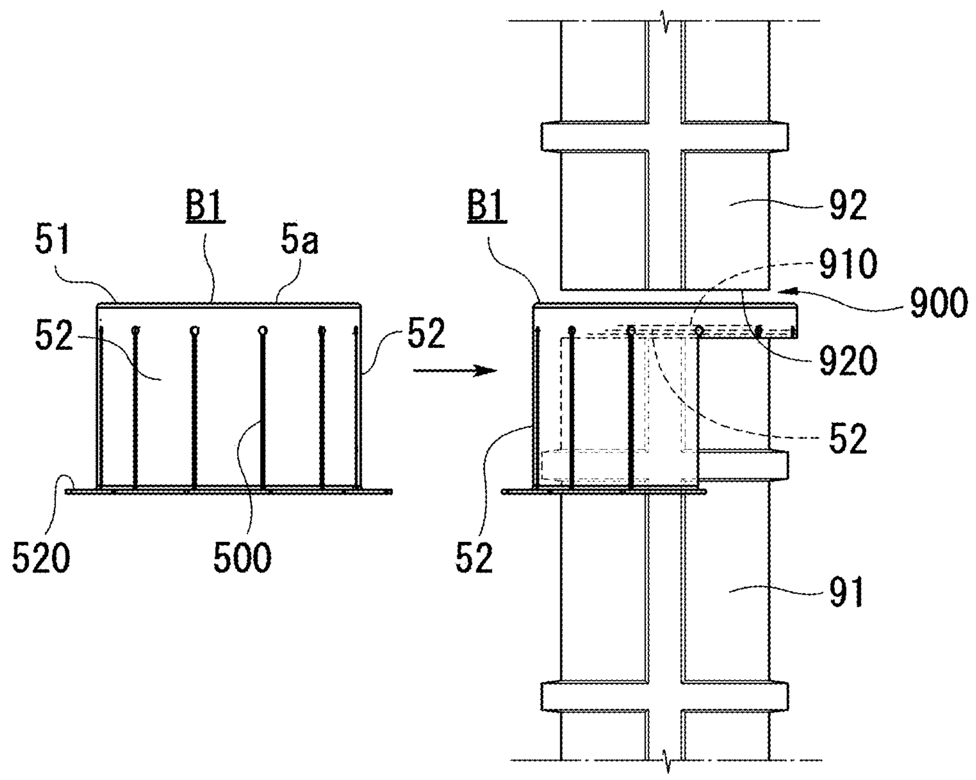
FIG. 5 is an explanatory diagram showing a method of attaching one of the embodiments of type B of the reducing material for gas pressure welding.

According to the reducing material for gas pressure welding B1, for example, when the reducing material for gas pressure welding B1 comes off before closing the gap between the pressure-welded surfaces 910, 920 of the respective materials to be pressure-welded, the reducing material for gas pressure welding B1 needs to be attached again, but even in that case, there is no need to make complicated adjustment by greatly widening the gap between the pressure-welded surfaces 910, 920 of the materials to be pressure-welded 91, 92 (see FIG. 5). As a result, the workload in that case is reduced, and consequently, the gas pressure welding can be easily performed.

A reducing material for gas pressure welding B2 shown in FIG. 2B has a cap body 5*b*. The cap body 5*b* is made of a sheet made of polystyrene resin, which is a thermoplastic resin. The cap body 5*b* has a circular top plate 51, around which a substantially cylindrical body portion 53 is provided at the same height over the entire circumference.

Further, the body portion 53 is provided with two body leg portions 54 divided by making a cut 500 in the longitudinal direction while partially leaving an origin end portion at one place in the circumferential direction. The body leg portions 54 extending over substantially the entire circumference have a tip portion provided with a flange portion 540. As a result, portions of the respective body leg portions 54 sandwiching the cut 500 can deform independently.

When the reducing material for gas pressure welding B2 is attached to the material to be pressure-welded 91, the top plate 51 is inserted into the gap 900 by opening both sides of the cut 500 of the body leg portions 54 and deforming them outward instead of deforming the body leg portions 52 inward as in the case of the reducing material for gas pressure welding B1.

As another method, the reducing material for gas pressure welding B2 is forcibly laterally fitted through the part of the cut 500 (for example, two surfaces with the cut 500 as a boundary are deformed in the front-rear direction, and the reducing material for gas pressure welding B2 is pushed onto the reinforcing bar through the gap (gap caused by the two surfaces deforming back and forth)). Other than this point, the reducing material for gas pressure welding B2 can also be used in substantially the same manner as the reducing material for gas pressure welding B1. Therefore, the description of the action is omitted here.

(Type C)

A reducing material for gas pressure welding C1 shown in FIG. 3A has a cap body 6*a*. The cap body 6*a* is made of a sheet made of polystyrene resin, which is a thermoplastic resin. The cap body 6*a* has a circular top plate 61. On the outer circumferential portion of the top plate 61, a hem portion 62 is provided over the entire circumference with the same width. The hem portion 62 is provided with three body leg portions 64 in the circumferential direction.

Of the body leg portions 64, a pair of adjacent body leg portions 64 facing each other is provided substantially on a diameter line of the top plate 61 and at a right angle to the top plate 61. The remaining one body leg portion 64 is provided parallel to the other opposing body leg portions 64 at a circumferential intermediate portion thereof. Each of the body leg portions 64 has a tip portion formed into a flange portion 640.

Note that an interval between the opposing body leg portions 64 is formed to be substantially equal to the diameter of the material to be pressure-welded 91 or larger than the diameter of the material to be pressure-welded 91. As a result, a fitting opening portion 65 is formed on the front side between the body leg portions 64.

(Action)

Here, with reference to FIG. 3A and FIG. 6, a gas pressure welding method using the reducing material for gas pressure welding C1, which is one of Type C, and its action will be described.

The cap body 6*a* of the reducing material for gas pressure welding C1 can be externally fitted onto the tip portion on the pressure-welded side (pressure-welded surface 910 side) of the material to be pressure-welded 91 such as a steel material. The cap body 6*a* is made of thermoplastic resin and has predetermined shape retainability and deformability. Therefore, the cap body 6*a* can be easily attached onto the tip portion of the material to be pressure-welded 91 by external fitting and can maintain the state even after the attachment.

As long as the pressure-welded surfaces 910, 920 of the materials to be pressure-welded 91, 92 are separated to at least a degree slightly larger than the thickness of the top plate 51 of the cap body 5*a*, the reducing material for gas pressure welding B1 can be attached onto the tip portion of the fixed material to be pressure-welded 91. In the cap body 6*a* of the reducing material for gas pressure welding C1, at the time of attachment, the fitting opening portion 65 between the opposing body leg portions 64 is aligned with the tip portion of the material to be pressure-welded 91, and the thickness portion of the top plate 61 is horizontally inserted into the gap 900 between the pressure-welded surfaces 910, 920 of the materials to be pressure-welded 91, 92.

Along with this, the fitting opening portion 65 is fitted around the side surface of the tip portion of the fixed material to be pressure-welded 91. Thus, the reducing material for gas pressure welding C1 can be attached onto the tip portion of the material to be pressure-welded 91 by aligning the top plate 61 with the pressure-welded surface 910 (see FIG. 6). With the reducing material for gas pressure welding C1 attached as described above, the material to be pressure-welded 92 descends and the top plate 61 of the cap body 6*a* is sandwiched between the pressure-welded surfaces 910, 920.

The top plate 51 is then heated by the flame of the gas together with the materials to be pressure-welded 91, 92, whereby the pressure welding of the respective materials to be pressure-welded 91, 92 can be firmly performed as in the case of using the reducing material for gas pressure welding A2 described above while preventing the formation of an oxide film on the pressure-welded surfaces 910, 920.

Figure 6:
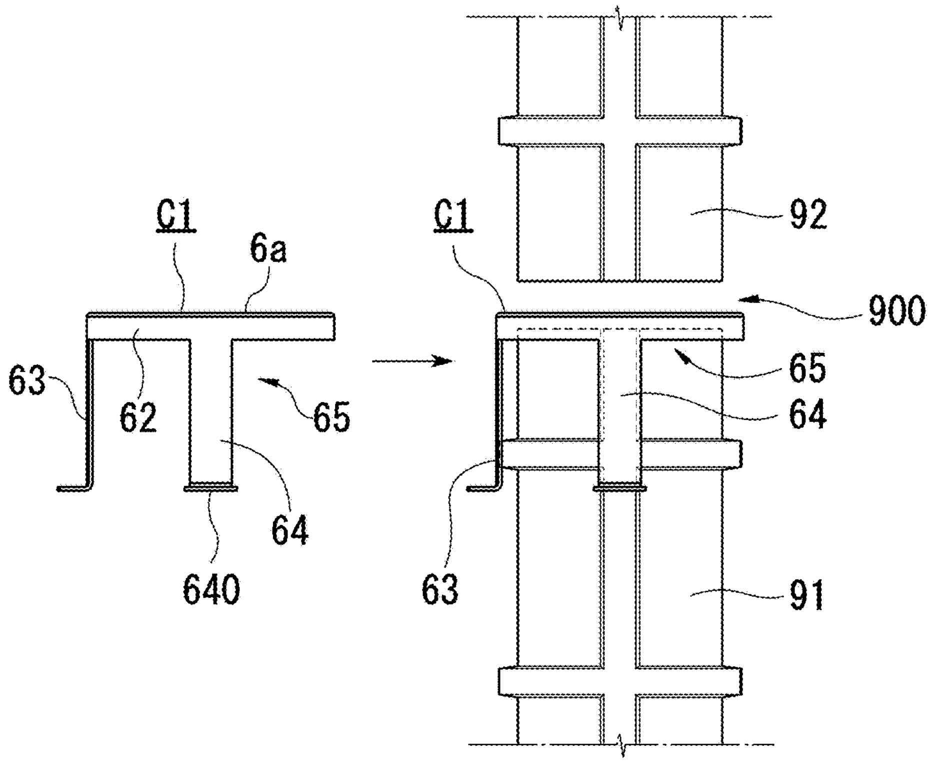
FIG. 6 is an explanatory diagram showing a method of attaching one of the embodiments of type C of the reducing material for gas pressure welding.

According to the reducing material for gas pressure welding C1, for example, when the reducing material for gas pressure welding C1 comes off before closing the gap between the pressure-welded surfaces 910, 920 of the respective materials to be pressure-welded, the reducing material for gas pressure welding C1 needs to be attached again, but even in that case, there is no need to make complicated adjustment by greatly widening the gap between the pressure-welded surfaces 910, 920 of the materials to be pressure-welded 91, 92 (see FIG. 6). As a result, the workload in that case is reduced, and consequently, the gas pressure welding can be easily performed.

Figure 3B:
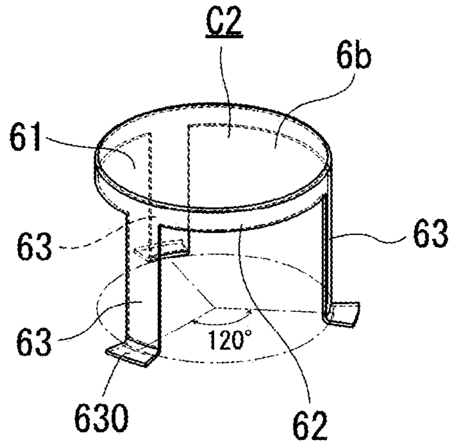

A reducing material for gas pressure welding C2 shown in FIG. 3B has a cap body 6*b*. The cap body 6*b* is made of a sheet made of polystyrene resin, which is a thermoplastic resin. The cap body 6*b* has a circular top plate 61. On the outer circumferential portion of the top plate 61, a hem portion 62 is provided over the entire circumference with the same width. The hem portion 62 is provided with three body leg portions 63 at equal intervals in the circumferential direction of the top plate 61. Each of the body leg portions 63 is provided at a right angle to the top plate 61. Each of the body leg portions 63 has a tip portion formed into a flange portion 630.

The circumferential interval between the respective body leg portions 63 is slightly narrower than the diameter of the material to be pressure-welded 91, so that any one of the body leg portions 63 needs to be deformed when the reducing material for gas pressure welding C2 is attached onto the tip portion of the material to be pressure-welded 91. Specifically, the body leg portions 63 on the left and right sides may be bent backward and laid between the pressure-welded surfaces 910, 920 or may be horizontally expanded as wide as the fitting opening portion 65 as it is.

Further, the worker may form the fitting opening portion by opening the body leg portions 63 toward the front or the back or by horizontally pressing the body leg portions 63 apart, and laterally fit the fitting opening portion, or the worker may press the gap between the body leg portions 63 against the reinforcing bar to horizontally press the body leg portions 63 apart, and laterally fit the fitting opening portion. Other than this point, the reducing material for gas pressure welding C2 can also be used in substantially the same manner as the reducing material for gas pressure welding C1. Therefore, the description of the action is omitted here.

(Another Example of Type A)

Figure 7:
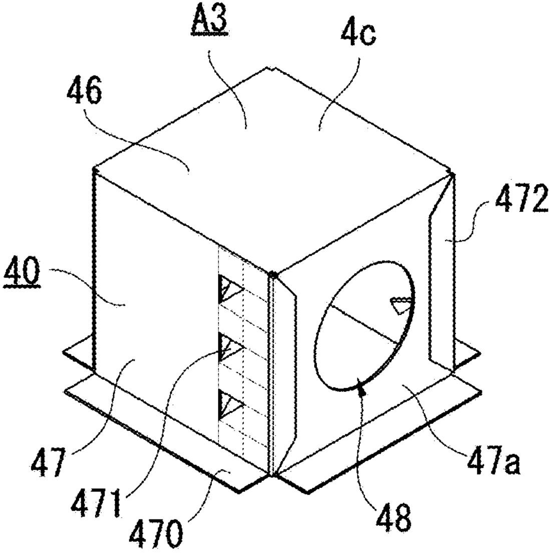
FIG. 7 is an explanatory diagram showing another embodiment of type A of the reducing material for gas pressure welding.

A reducing material for gas pressure welding A3 shown in FIG. 7 has a cap body 4*c*. The cap body 4*c* is made of a sheet made of polystyrene resin, which is a thermoplastic resin. The cap body 4*c* has a square top plate 46 on its top portion, and rectangular side plates of the same size constituting a body portion 40 are connected to four sides of the top plate 46.

Of the side plates, side plates 47 attached to three sides of the top plate 46 are connected to each other at side portions and integrated in the circumferential direction. A side plate 47*a* attached to the other side of the top plate 46 can deform and swing around an attachment edge (reference sign omitted). The side plates 47, 47*a* each have a hem end portion bent at a substantially right angle with a predetermined width to form a flange portion 470.

In FIG. 7, near the side plate 47*a* of two side plates 47 on the left and right sides, engagement portions 471 are provided at three places at equal intervals, each formed by making cuts in two legs of a right triangle and creating a crease connecting respective tips. As a result, by bending the engagement portions 471 inward and projecting them, they can be caught on the surface of the material to be pressure-welded 91 inside at the time of attachment and the reducing material for gas pressure welding A3 can be fixed so as not to be displaced.

Further, a pressing plate 472 is provided over the entire length at an edge portion on the side plate 47*a* side of the two side plates 47 on the left and right sides. Furthermore, a circular punched hole 48 is provided penetrating the front and back at a central portion of the side plate 47*a*.

In the reducing material for gas pressure welding A3, a part of the body portion 40 can be opened and closed by swinging of the side plate 47*a*, and a fitting opening portion (reference sign omitted) for fitting around the material to be pressure-welded from the side surface can be formed by moving the side plate 47*a* inside.

The side plate 47*a* is stopped from moving outward by the pressing plates 472 on both sides. Further, the action after the reducing material for gas pressure welding A3 is attached to the material to be pressure-welded 91 is the same as that of the reducing material for gas pressure welding A1, so that the description thereof is omitted here.

Figure 8:
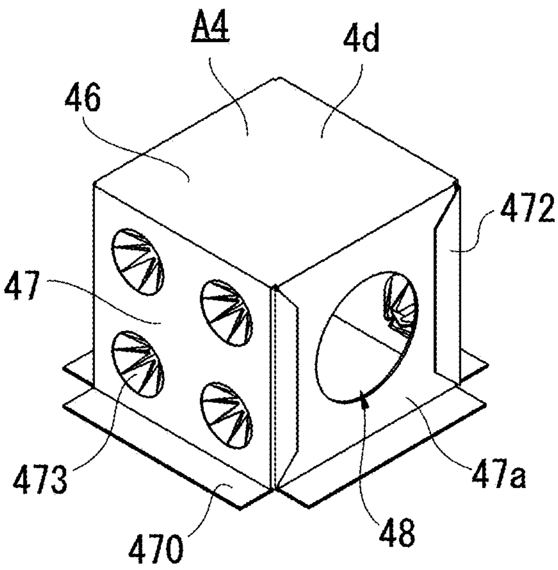
FIG. 8 is an explanatory diagram showing still another embodiment of type A of the reducing material for gas pressure welding.

A reducing material for gas pressure welding A4 shown in FIG. 8 has a cap body 4*d* and the cap body 4*d* has a top plate 46 and side plates 47, 47*a* and is formed in a bottomed box shape, which is similar to the reducing material for gas pressure welding A3. In the reducing material for gas pressure welding A4, each of the three side plates 47 is provided with substantially triangular engagement portions 473 connected in a circular direction and provided with substantially circular creases at four places.

The side plate 47*a* is stopped from moving outward by the pressing plates 472 on both sides. Further, the action after the reducing material for gas pressure welding A4 is attached to the material to be pressure-welded 91 is the same as that of the reducing material for gas pressure welding A1, so that the description thereof is omitted here.

Figure 9:
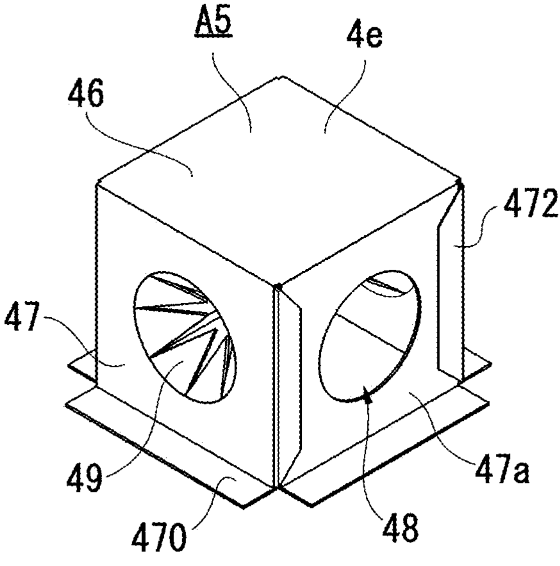
FIG. 9 is an explanatory diagram showing still another embodiment of type A of the reducing material for gas pressure welding.

A reducing material for gas pressure welding A5 shown in FIG. 9 has a cap body 4*e* and the cap body 4*e* has a top plate 46 and side plates 47, 47*a* and is formed in a bottomed box shape, which is similar to the reducing material for gas pressure welding A3. In the reducing material for gas pressure welding A5, two side plates 47 on the left and right sides are each provided with substantially triangular engagement portions 49 connected in a circular direction and provided with a substantially circular crease at one place of a central portion of the side plate 47.

Side plates 47*a* are provided at two places, front and rear, and each of the side plates 47*a* is provided with a punched through hole 48 at a central portion thereof. Each of the side plates 47*a* is stopped from moving outward by pressing plates 472 on both sides. Further, the action after the reducing material for gas pressure welding A5 is attached to the material to be pressure-welded 91 is the same as that of the reducing material for gas pressure welding A1, so that the description thereof is omitted here.

(Another Example of Type B)

Figure 10A:
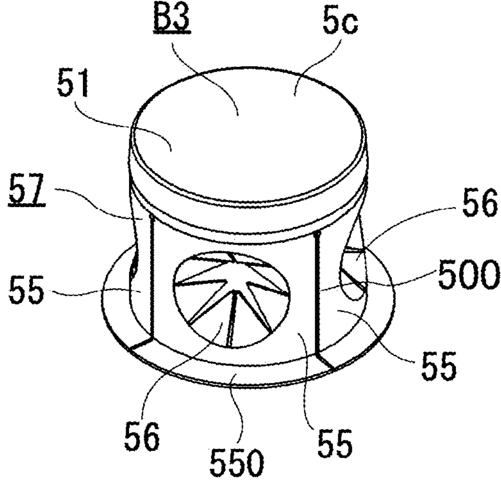
FIG. 10A and FIG. 10B are explanatory diagrams showing other embodiments of type B of the reducing material for gas pressure welding.
Figure 10B:
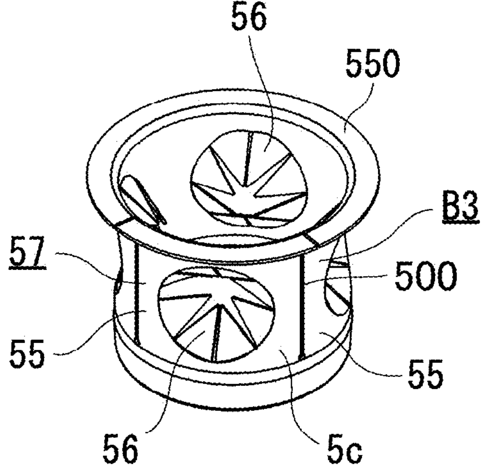

A reducing material for gas pressure welding B3 shown in FIG. 10 has a cap body 5*c*. The cap body 5*c* is made of a sheet made of polystyrene resin, which is a plastic resin. The cap body 5*c* has a circular top plate 51, around which a substantially cylindrical body portion 57 is provided at the same height over the entire circumference.

Further, the body portion 57 is formed with body leg portions 55 at four places by making cuts 500 in the longitudinal direction while partially leaving the origin end portions with a predetermined width spacing over the entire circumference. Each of the body leg portions 55 has a central portion provided with substantially triangular engagement portions 56 connected in a circular direction and provided with a substantially circular crease at one place. Further, each body leg portion 55 has a tip portion provided with a flange portion 550. As a result, each body leg portion 55 can deform independently.

Since the body leg portions 55 are provided at four places in the circumferential direction, the body leg portions 55 are deformed at two places and fitted around the material to be pressure-welded 91 to be attached. Furthermore, when the reducing material for gas pressure welding B3 is attached to the material to be pressure-welded 91, the displacement of the reducing material for gas pressure welding B3 can be prevented by projecting the engagement portions 56 inward, which is similar to the reducing materials for gas pressure welding A3, A4, A5 described above. Further, the action after the reducing material for gas pressure welding B3 is attached to the material to be pressure-welded 91 is the same as that of the reducing material for gas pressure welding B1, so that the description thereof is omitted here.

Further, although not shown, the reducing material for gas pressure welding of the present invention may adopt a structure in which a cap body that can be externally fitted onto the tip portion of the material to be pressure-welded 91 is provided and the cap body has a body portion formed so as to be fittable around the material to be pressure-welded from the side surface by deforming the shape thereof.

In the reducing material for gas pressure welding, the body portion of the cap body is formed of, for example, a material that is extremely soft and has sufficient strength, and is easily deformed. Thus, the reducing material for gas pressure welding can be fitted around the materials to be pressure-welded 91, 92 from the side surface by inserting and fitting the top portion into the gap 900 between the tip surfaces 910, 920 of the materials to be pressure-welded 91, 92 while deforming the body portion.

Further, the portion deformed in the body portion at the time of fitting can be returned to its original shape after the fitting to fix the reducing material for gas pressure welding such that the tip surface is surrounded with the body portion, or may be folded into the gap while being deformed. In this case, the folded portion can be preferably used as a reducing material.

Next, embodiments of the present invention will be described in detail with reference to FIG. 11 to FIG. 19. In the following description of reducing materials for gas pressure welding, they will be further divided into three types (D, E, F) and explained. Type D is a reducing material for gas pressure welding provided with a fitting opening portion in advance, Type E is a reducing material for gas pressure welding provided with a weakening line so that a fitting opening portion and an opening/closing port portion can be formed, and Type F is a reducing material for gas pressure welding made by stacking a reducing material for gas pressure welding provided with a fitting opening portion in advance and a bottomed cylindrical cap body.

(Type D)

A reducing material for gas pressure welding D1 shown in FIG. 11A has a cap body 1*a*. The cap body 1*a* is made of a sheet made of polystyrene resin, which is a thermoplastic resin. The cap body 1*a* has a body portion 10 (cylindrical portion) processed from a slightly flared cylindrical shape as a base, and has an upper end portion closed by a circular top plate 11 in FIG. 11A.

Further, the body portion 10 is provided with a cut edge 120 in the circumferential direction so as to have a predetermined thickness along the top plate 11, having a width allowing the cut edge 120 to be fitted around the material to be pressure-welded 91 (see FIG. 14 to FIG. 16) described later. A thickness portion formed by the cut edge 120 and the top plate 11 has a partial cylindrical shape, and this portion also serves as a fitting portion 121 that prevents falling off when externally fitted onto the tip portion of the material to be pressure-welded 91.

Continuing from both end portions of the cut edge 120, cut edges 122, 123 are each provided in a direction substantially at a right angle to the top plate 11 at the remaining thickness (height) portion of the body portion 10, and a fitting opening portion 12 having U-shaped cut edges is formed. The cap body 1*a* has a hem portion provided with a flange portion 13 having a slightly large diameter over the entire length.

The central angle between the cut edge 122 and the cut edge 123 (the opening angle of the fitting opening portion 12) in plan view of the reducing material for gas pressure welding D1 is set to 150° in the present embodiment. However, the present invention is not limited thereto. The central angle is sufficient if it allows at least the cut edge portion of the fitting opening portion 12 to be inserted around the material to be pressure-welded 91, and is desirably an angle smaller than 180° so that the state can be maintained after insertion (see FIG. 11B).

A reducing material for gas pressure welding D2 shown in FIG. 11C has a cap body 1*c*. The cap body 1*c* is made of a sheet made of polystyrene resin, which is a thermoplastic resin. The cap body 1*c* has a body portion 10*c* processed from a slightly flared cylindrical shape as a base, and has an upper end portion closed by a circular top plate 11 in FIG. 11C.

Further, the body portion 10*c* is provided with a cut edge 124 in the circumferential direction so as to have a predetermined thickness along the top plate 11, having a width allowing the cut edge 124 to be fitted around the material to be pressure-welded 91 described later. A thickness portion formed by the cut edge 124 and the top plate 11 has a partial cylindrical shape, and this portion also serves as a fitting portion 125 that prevents falling off when externally fitted onto the tip portion of the material to be pressure-welded 91.

Continuing from both end portions of the cut edge 124, substantially S-shaped cut edges 126, 127 bilaterally symmetrical to the top plate 11 are provided at the remaining thickness (height) portion of the body portion 10*c* to form a fitting opening portion 12*c*. The cap body 1*c* has a hem portion provided with a flange portion 13 having a slightly large diameter over the entire length. The substantially S-shaped cut edges 126, 127 each have a structure in which a side close to the hem portion projects in a direction of narrowing the fitting opening portion 12*c* to form a holding portion 128, 129.

(Action)

Here, with reference to FIG. 11A and FIG. 14, a gas pressure welding method using the reducing material for gas pressure welding D1, which is one of Type D, and its action will be described.

The cap body 1*a* of the reducing material for gas pressure welding D1 can be externally fitted onto the tip portion on the pressure-welded side (pressure-welded surface 910 side)

of the material to be pressure-welded 91. The cap body 1*a* is made of thermoplastic resin and has predetermined shape retainability and deformability. Therefore, the cap body 1*a* can be easily attached onto the tip portion of the material to be pressure-welded 91 by external fitting and can maintain the state even after the attachment.

When performing gas pressure welding of the materials to be pressure-welded 91, 92, first, the fixed material to be pressure-welded 91 is held at a predetermined height in a vertically erected state by a fixed clamp (not shown). Further, the movable material to be pressure-welded 92 is held in a vertically erected state by a movable clamp (not shown). The materials to be pressure-welded 91, 92 are adjusted so that their center lines are on the same straight line, and the pressure-welded surfaces 910, 920 of the materials to be pressure-welded 91, 92 are set at an appropriate interval. Note that the pressure welding may be performed with the materials to be pressure-welded 91, 92 held in the horizontal direction.

In the cap body 1*a* of the reducing material for gas pressure welding D1, the fitting opening portion 12 is formed from the portion along the top plate 11 to the hem end portion in the body portion 10 by the cut edges, so that the reducing material for gas pressure welding D1 can be attached onto the tip portion of the fixed material to be pressure-welded 91 as long as the pressure-welded surfaces 910, 920 of the materials to be pressure-welded 91, 92 are separated to at least a degree equal to the thickness of the top portion of the cap body 1*a*.

That is, first, the thickness portion of the top portion is horizontally inserted into the gap between the pressure-welded surfaces 910, 920 of the materials to be pressure-welded 91, 92. Note that the top portion may be tilted or inserted in the tilting direction instead of the horizontal direction. Along with this, the fitting opening portion 12 continuing from the portion along the top portion to the hem end portion is fitted around the side surface of the tip portion of the fixed material to be pressure-welded 91. Thus, the reducing material for gas pressure welding D1 can be attached onto the tip portion of the material to be pressure-welded 91 by dropping the top portion onto the pressure-welded surface 910 (see FIG. 14A). Note that the attachment by dropping may be performed not only with the pressure-welded surface 910 positioned above the fitting opening portion 12 (closer to the top portion than the fitting opening portion 12 or at the top portion) but also positioned below the fitting opening portion 12.

With the reducing material for gas pressure welding D1 attached as described above, the material to be pressure-welded 92 descends and the top plate 11 of the cap body 1*a* is sandwiched between the pressure-welded surfaces 910, 920.

The top plate 43 is then heated by the flame of the gas together with the materials to be pressure-welded 91, 92, whereby the pressure welding can be firmly performed while preventing the formation of an oxide film on the pressure-welded surfaces 910, 920.

That is, in a slight gap sandwiched between the tip surfaces of the respective materials to be pressure-welded, the top portion of the cap body made of thermoplastic resin is melted, burned, and further vaporized to rapidly increase in volume in a very short time, whereby the air is pushed out to the outside at a high pressure, and oxygen in the air is combined with carbon of the polymer to become carbon dioxide gas, and oxidation on the pressure-welded surfaces is suppressed.

Figures 14A, 14B:
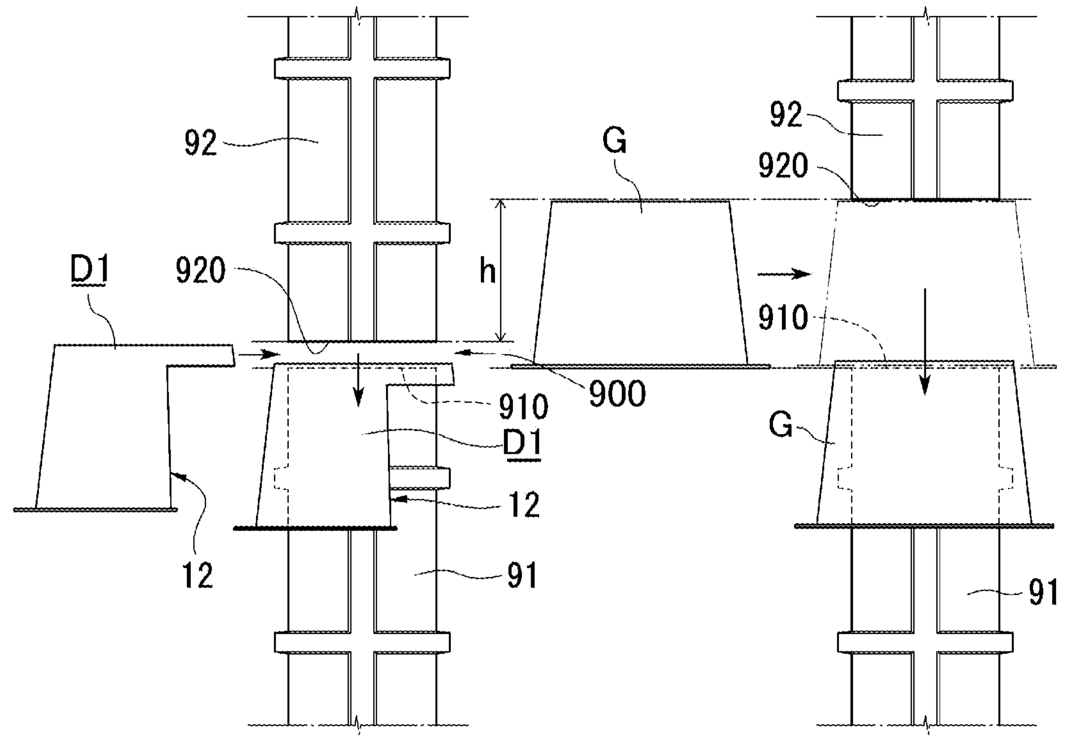
FIG. 14A and FIG. 14B are explanatory diagrams showing a method of attaching one of the embodiments of type D of the reducing material for gas pressure welding.

Further, according to the reducing material for gas pressure welding D1, for example, when the reducing material for gas pressure welding D1 comes off before closing the gap between the pressure-welded surfaces 910, 920 of the respective materials to be pressure-welded, the reducing material for gas pressure welding D1 needs to be attached again, but even in that case, there is no need to make complicated adjustment by greatly widening the gap between the pressure-welded surfaces 910, 920 of the materials to be pressure-welded 91, 92 (see FIG. 14A).

If the fitting opening portion is not provided in the cap body as in the reducing material for gas pressure welding D shown in FIG. 14B, the pressure-welded surface 920 needs to be adjusted higher than the pressure-welded surface 910 shown in FIG. 14A by at least the height h in order to insert the reducing material for gas pressure welding D into the gap. The work of securing the gap between the pressure-welded surfaces 910, 920 of the materials to be pressure-welded 91, 92 is very time-consuming and troublesome work, and it is even more so especially when the gap is large, which increases the workload.

On the contrary, in the reducing material for gas pressure welding D1, the reducing material for gas pressure welding D1 can be attached as described above simply by widening the gap to a gap having a width equal to the thickness of the top portion of the cap body 1*a* which is significantly thinner than the thickness of the entire cap body 1*a*. As a result, the complexity of the work can be greatly reduced, and consequently, the gas pressure welding can be easily performed.

When attached to the material to be pressure-welded 91, the reducing material for gas pressure welding D2 grips the material to be pressure-welded 91 with the holding portions 128, 129 in such a manner as to slightly wrap around the material to be pressure-welded 91. This is excellent in holding force that prevents the reducing material for gas pressure welding D2 from coming off. Other than that, the action is the same as that of the reducing material for gas pressure welding D1 described above. Therefore, the description thereof is omitted here.

(Type E)

A reducing material for gas pressure welding E1 shown in FIG. 12A has a cap body 2*a*. The cap body 2*a* is made of a sheet made of polystyrene resin, which is a thermoplastic resin. The cap body 2*a* has a body portion 20*a* having a slightly flared cylindrical shape, and has an upper end portion closed by a circular top plate 21 in FIG. 12A.

Further, the body portion 20*a* is provided with a weakening line 22*a* that can be separated by tearing. The weakening line 22*a* has a perforation 220 in the circumferential direction so as to have a predetermined thickness along the top plate 21 and having a width allowing the perforation 220 to be fitted around the material to be pressure-welded 91. A thickness portion formed by the perforation 220 and the top plate 21 has a partial cylindrical shape, and this portion also serves as a fitting portion 221 that prevents falling off when externally fitted onto the tip portion of the material to be pressure-welded 91 after a tear-off piece 200 described later is separated.

Continuing from both end portions of the perforation 220, perforations 222, 223 are each provided up to the hem end portion in a direction substantially at a right angle to the top plate 21 at the remaining thickness (height) portion of the body portion 20*a* to form a U shape. Both end corner portions of the perforation 220 are each provided with a circular hole 229 to prevent excessive cutting during separation. Note that the hole 229 may have another shape such as a quadrangle.

Further, the cap body 2*a* has a hem portion provided with a flange portion 2273*a* having a slightly large diameter over the entire length. By cutting along the perforations 220, 222, 223, the tear-off piece 200 can be separated to form a fitting opening portion similar to the fitting opening portion 12 of the reducing material for gas pressure welding D1 described above.

A reducing material for gas pressure welding E2 shown in FIG. 12B has a cap body 2*b*. The cap body 2*b* is made of a sheet made of polystyrene resin, which is a thermoplastic resin. The cap body 2*b* has a body portion 20*b* having a slightly flared cylindrical shape, and has an upper end portion closed by a circular top plate 21 in FIG. 12B.

The body portion 20*b* is provided with a weakening line 22*b* that can be separated by tearing. The weakening line 22*b* has a perforation 224 in the circumferential direction so as to have a predetermined thickness along the top plate 21 and having a width allowing the perforation 224 to be fitted around the material to be pressure-welded 91, and continuing from an intermediate portion of the perforation 224, the weakening line 22*b* is provided with a perforation 225 up to the hem end portion in a direction substantially at a right angle to the top plate 21 at the remaining thickness (height) portion of the body portion 20*b* to form a substantially T shape.

By separating along the perforations 224, 225, opening/closing pieces 226, 227 can be formed. A thickness portion formed by the perforation 224 and the top plate 21 has a partial cylindrical shape. This portion also serves as a fitting portion 228 that prevents falling off when externally fitted onto the tip portion of the material to be pressure-welded 91.

Further, the cap body 2*b* has a hem portion provided with a flange portion 23*b* having a slightly large diameter over the entire circumference. By cutting along the perforations 224, 225, the opening/closing pieces 226, 227 can be opened and closed, and by opening the opening/closing pieces 226, 227, an opening/closing port portion (not shown) can be formed.

Note that the perforations are adopted as the weakening line in the present embodiment, but the present invention is not limited thereto. The weakening line may be any line that can be easily torn off by hand, such as a structure in which short slits are provided in an intermittent line or a structure in which the sheet is extremely reduced in thickness and provided in a line.

(Action)

Figure 15:
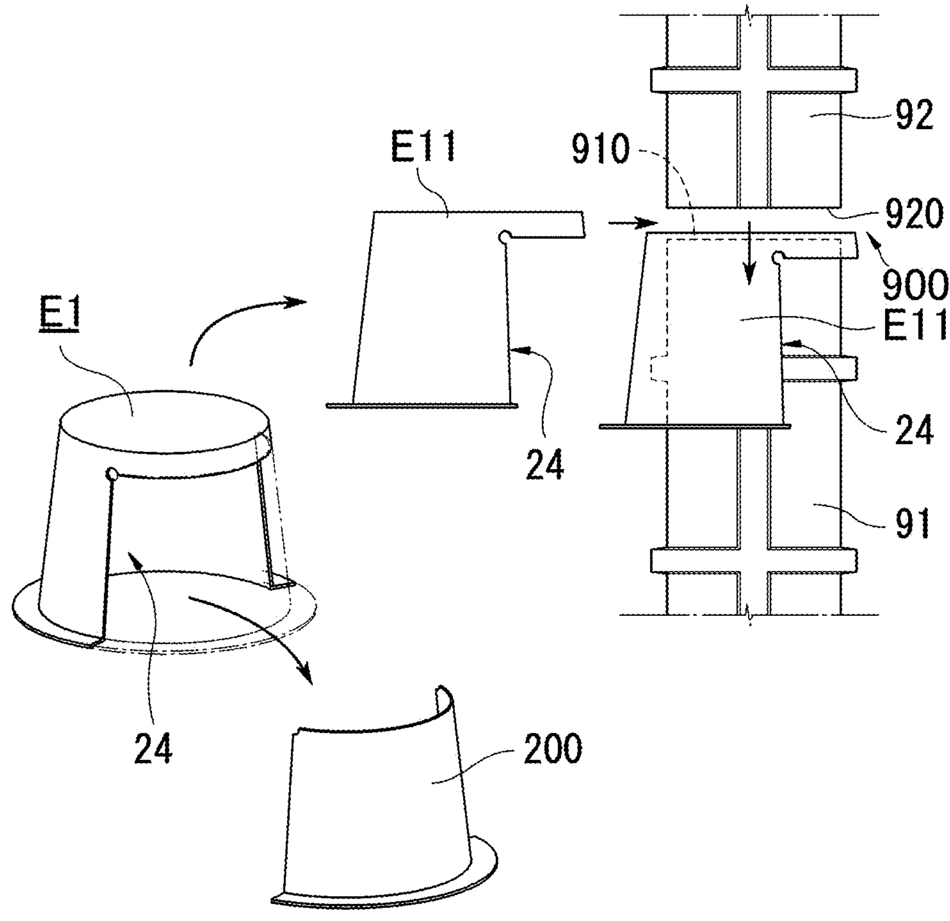
FIG. 15 is an explanatory diagram showing a method of attaching one of the embodiments of type E of the reducing material for gas pressure welding.

Here, with reference to FIG. 12A and FIG. 15, a gas pressure welding method using the reducing material for gas pressure welding E1, which is one of Type E, and its action will be described.

The cap body 2*a* of the reducing material for gas pressure welding E1 can be externally fitted onto the tip portion on the pressure-welded side (pressure-welded surface 910 side) of the material to be pressure-welded 91. The cap body 2*a* is made of thermoplastic resin and has predetermined shape retainability and deformability. Therefore, the cap body 2*a* can be easily attached onto the tip portion of the material to be pressure-welded 91 by external fitting and can maintain the state even after the attachment.

When performing the gas pressure welding of the materials to be pressure-welded 91, 92, the fixed material to be pressure-welded 91 and the movable material to be pressure-welded 92 are set in the same manner as in the case of the pressure welding using the reducing material for gas pressure welding D1 described above. For example, when it becomes necessary to attach the reducing material for gas pressure welding E1 again, the cap body 2*a* is cut along the perforations 220, 222, 223, whereby the tear-off piece 200, which is an unnecessary part, can be separated to create a reducing material for gas pressure welding E11 having a fitting opening portion 24 (see FIG. 15).

The usage method and the action of the reducing material for gas pressure welding E11 after the fitting opening portion 24 is formed in the cap body 2*a* are similar to those of the reducing material for gas pressure welding D1 described above. Note that in the reducing material for gas pressure welding E1 as well, the reducing material for gas pressure welding E1 needs to be attached again when the reducing material for gas pressure welding E1 comes off before the gap between the pressure-welded surfaces 910, 920 of the respective materials to be pressure-welded is closed.

At this time, the gap between the pressure-welded surfaces 910, 920 of the respective materials to be pressure-welded 91, 92 does not need to be greatly widened and adjusted, and the reducing material for gas pressure welding E1 can be attached simply by widening the gap to a gap having a width equal to the thickness of the top portion of the cap body 2*a* which is significantly thinner than the thickness of the entire cap body 2*a*, which is similar to the reducing material for gas pressure welding D1 described above.

In the case of the reducing material for gas pressure welding E2, for example, when it becomes necessary to attach the reducing material for gas pressure welding E2 again after the materials to be pressure-welded 91, 92 are set, the cap body 2*b* is cut along the perforations 224, 225, whereby the opening/closing pieces 226, 227 can be deformed inward and outward to make them openable and closable. As a result, a reducing material for gas pressure welding (not shown) in which an opening/closing port portion (not shown) can be formed by opening the opening/closing pieces 226, 227 can be created.

In a gas pressure welding method using the reducing material for gas pressure welding E2, the opening/closing pieces 226, 227 are opened, and the opening/closing port portion is formed in the cap body 2*b*. The thickness portion of the top portion is then inserted into the gap between the pressure-welded surfaces 910, 920 of the materials to be pressure-welded 91, 92. Along with this, the opening/closing port portion continuing from the portion along the top portion to the hem end portion is fitted around the side surface of the tip portion of the fixed material to be pressure-welded 91, so that the reducing material for gas pressure welding E2 can be attached onto the tip portion of the material to be pressure-welded 91 by dropping the top portion onto the pressure-welded surface 910.

Note that in the reducing material for gas pressure welding E2 as well, the reducing material for gas pressure welding E2 needs to be attached again when the reducing material for gas pressure welding E2 comes off before the gap between the pressure-welded surfaces 910, 920 of the respective materials to be pressure-welded is closed. At this time, the gap between the pressure-welded surfaces 910, 920 of the materials to be pressure-welded 91, 92 does not need to be greatly widened and adjusted, and the reducing material for gas pressure welding E2 can be attached simply by widening the gap to a gap having a width equal to the thickness of the top portion of the cap body 2*b* which is significantly thinner than the thickness of the entire cap body 2*b*, which is similar to the reducing material for gas pressure welding D1 described above.

(Type F)

Figures 13A, 13B:
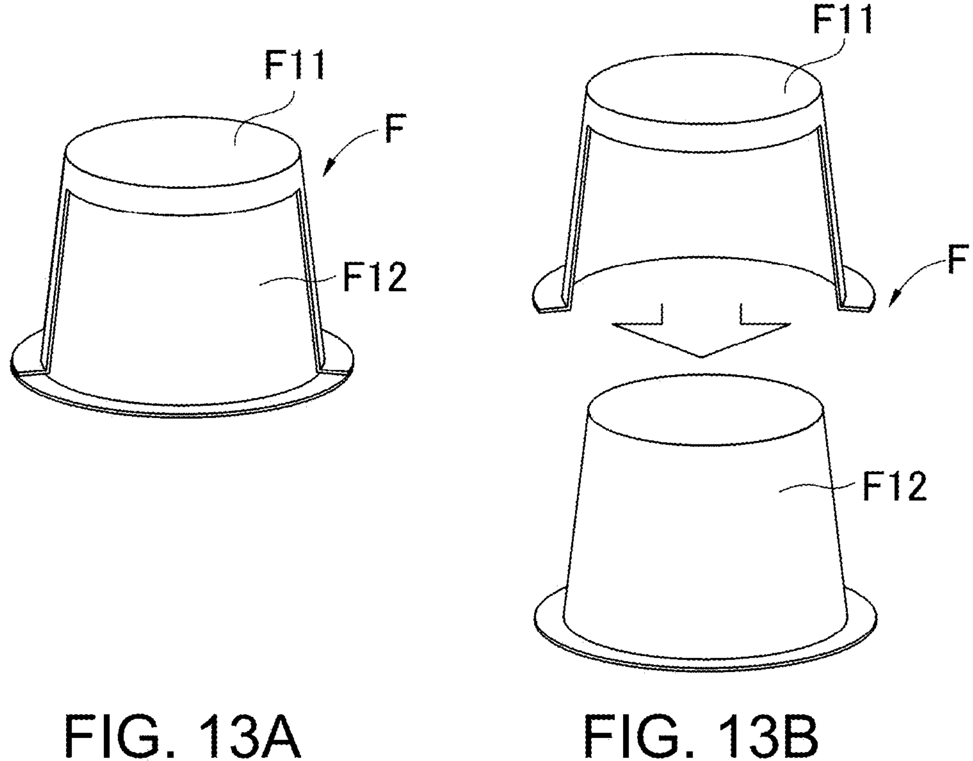
FIG. 13A and FIG. 13B are explanatory diagrams showing an embodiment of type F of the reducing material for gas pressure welding according to the present invention.

A reducing material for gas pressure welding F shown in FIG. 13 is configured by combining a reducing material for gas pressure welding F11 having the same structure as the reducing material for gas pressure welding D1 described above (the fitting opening portion is provided in the cap body) and a reducing material for gas pressure welding F12 having a bottomed cylindrical shape and having a second cap body with a shape substantially similar to the reducing material for gas pressure welding E1 described above and a structure in which the weakening line 22*a* is not provided. The description of the respective structures of the reducing material for gas pressure welding F11 and the reducing material for gas pressure welding F12 is omitted here.

In the present embodiment, the reducing material for gas pressure welding F has a double structure in which the reducing material for gas pressure welding F11 is placed over the reducing material for gas pressure welding F12. The reducing material for gas pressure welding F11 is processed from a reducing material for gas pressure welding having the same shape as the reducing material for gas pressure welding F12, and is slightly tightly placed using the flexibility of the polystyrene resin sheet.

Note that, in the double-structured reducing material for gas pressure welding F, contrary to the above, the reducing material for gas pressure welding F12 can be placed over the reducing material for gas pressure welding F11 to be combined. When the reducing material for gas pressure welding F12 is placed over the reducing material for gas pressure welding F11, the reducing material for gas pressure welding F11 is housed in the reducing material for gas pressure welding F12. Therefore, there is an advantage that the reducing material for gas pressure welding F11 is less likely to fall off due to unintended contact, etc.

(Action)

Figure 16:
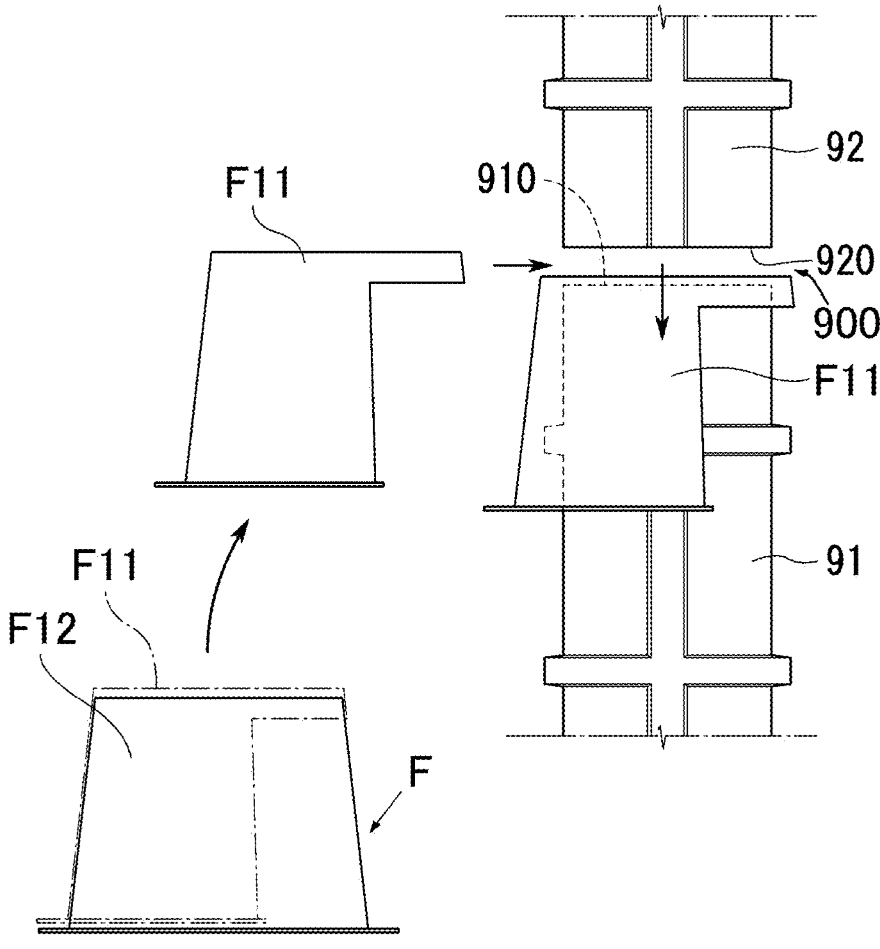
FIG. 16 is an explanatory diagram showing a method of attaching the embodiment of type F of the reducing material for gas pressure welding.

Here, with reference to FIG. 13 and FIG. 16, a gas pressure welding method using the reducing material for gas pressure welding F, which is one of Type F, and its action will be described.

The reducing material for gas pressure welding F has a structure in which the reducing material for gas pressure welding F11 having a fitting opening portion is stacked on the outside of the reducing material for gas pressure welding F12, which is a bottomed cylindrical body.

First, when the reducing material for gas pressure welding F is placed on the tip portion of the fixed material to be pressure-welded 91 before the top portion of the cap body of the reducing material for gas pressure welding F is sandwiched between the pressure-welded surfaces 910, 920 of the respective materials to be pressure-welded 91, 92, that is, when the gap between them is wide open, the reducing material for gas pressure welding F is placed while maintaining the double structure. As a result, even if some wind blows before the top portion of the cap body is sandwiched, the reducing material for gas pressure welding F is less likely to come off the tip portion of the material to be pressure-welded 91 due to the action of the deep body portion of the reducing material for gas pressure welding F12, which is a bottomed cylindrical body.

If the reducing material for gas pressure welding F does not come off by the time the top portion of the cap body of the reducing material for gas pressure welding F is sandwiched between the pressure-welded surfaces 910, 920 of the respective materials to be pressure-welded 91, 92, the sandwiched double-structured reducing material for gas pressure welding F is used as it is as a reducing material. Note that the top portion of the cap body of the reducing material for gas pressure welding F is also double layered, so that a favorable influence on the effect as a reducing material can be expected.

Further, if the reducing material for gas pressure welding F comes off by the time the top portion of the cap body of the reducing material for gas pressure welding F is sandwiched between the pressure-welded surfaces 910, 920 of the respective materials to be pressure-welded 91, 92, with the reducing material for gas pressure welding F detached, the reducing material for gas pressure welding F11 having the fitting opening portion 24 in the cap body is removed from the reducing material for gas pressure welding F12, and only the reducing material for gas pressure welding F11 is used as a reducing material.

Note that the action at the time of using the reducing material for gas pressure welding F11 is similar to that of the reducing material for gas pressure welding D1. When the reducing material for gas pressure welding F11 is attached again, the gap between the pressure-welded surfaces 910, 920 of the materials to be pressure-welded 91, 92 does not need to be greatly widened and adjusted, and the reducing material for gas pressure welding F11 can be attached simply by widening the gap to a gap having a width equal to the thickness of the top portion of the cap body which is significantly thinner than the thickness of the entire cap body.

Figures 17A, 17B:
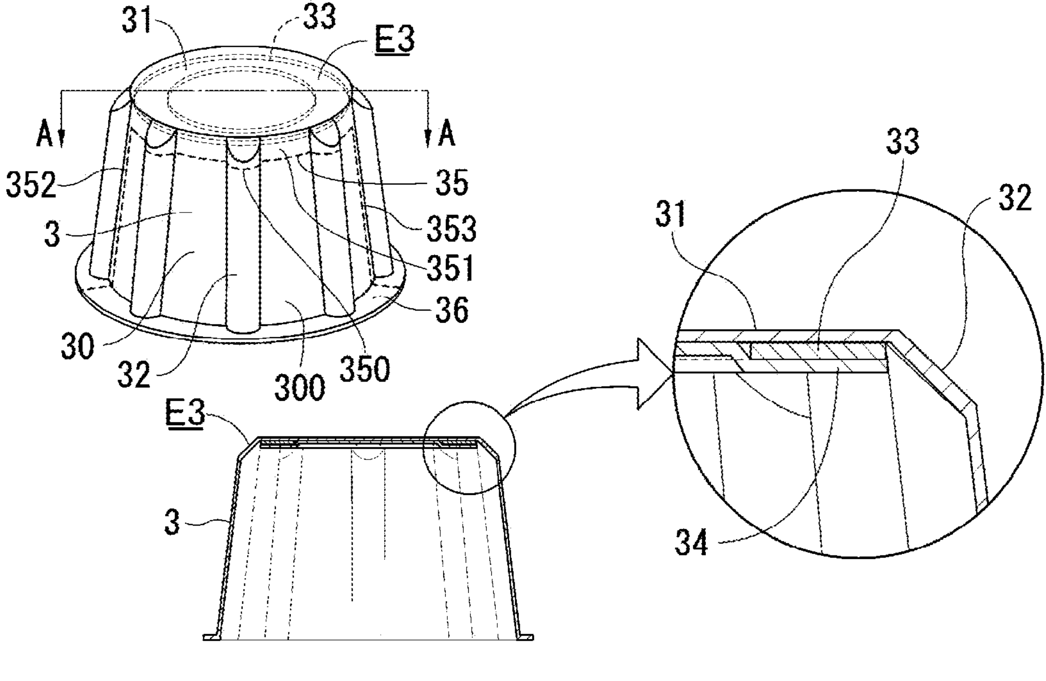

The reducing material for gas pressure welding F11 can be combined with an air blocking ring and a reducing sheet in order to more reliably prevent the formation of an oxide film on the pressure-welded surfaces 910, 920 when the materials to be pressure-welded 91, 92 are pressure welded. A reducing material for gas pressure welding E3 shown in FIG. 17 is one of embodiments of Type E.

The reducing material for gas pressure welding E3 has a cap body 3. The cap body 3 is made of a sheet made of polystyrene resin, which is a thermoplastic resin. The cap body 3 has a body portion 30 having a slightly flared cylindrical shape, and has an upper end portion closed by a circular top plate 31.

The body portion 30 is provided with longitudinal reinforcing portions 32 bulging outward at predetermined intervals in the circumferential direction. Further, the body portion 30 is provided with a weakening line 35 that can be separated by tearing. The weakening line 35 has a perforation 350 provided in the circumferential direction so as to have a predetermined thickness along the top plate 31 and having a width allowing the perforation 350 to be fitted around the material to be pressure-welded 91.

A thickness portion formed by the perforation 350 and the top plate 31 has a partial cylindrical shape. This portion also serves as a fitting portion 351 that prevents falling off when externally fitted onto the tip portion of the material to be pressure-welded 91 after a tear-off piece 300 is separated. Note that the reducing material for gas pressure welding E3 has strength due to the longitudinal reinforcing portions 32 and has good grip on the material to be pressure-welded 91.

Continuing from both end portions of the perforation 350, perforations 352, 353 are each provided up to the hem end portion in a direction substantially at a right angle to the top plate 31 at the remaining thickness (height) portion of the body portion 30 to form a U shape. Further, the cap body 3 has a hem portion provided with a flange portion 36 having a slightly large diameter over the entire circumference. By cutting along the perforations 352, 353, the tear-off piece 300 can be separated to form a fitting opening portion similar to the fitting opening portion 12 of the reducing material for gas pressure welding D1 described above.

Further, an air blocking ring 33 made of polyimide resin, which is a thermosetting resin, is arranged on an inner surface (lower surface) of the top plate 31, and a circular reducing sheet 34 having a diameter slightly larger than that of the air blocking ring 33 and made of polystyrene resin is welded to the top plate 31 at a central portion with the air blocking ring 33 sandwiched between the inner surface of the top plate 31 and the reducing sheet 34. The reducing sheet 34 is thermally deformed so as to substantially follow the outer shape of the air blocking ring 33 and cooperates with the inner surface to enclose the air blocking ring 33 (see the enlarged view of FIG. 17).

When performing the gas pressure welding of the materials to be pressure-welded 91, 92 using the reducing material for gas pressure welding E3, the fixed material to be pressure-welded 91 and the movable material to be pressure-welded 92 are set in the same manner as in the case of the pressure welding using the reducing material for gas pressure welding D1. For example, when it becomes necessary to attach the reducing material for gas pressure welding E3 again, the cap body 3 is cut along the perforations 350, 352, 353, whereby the tear-off piece 300, which is an unnecessary part, can be separated to create a reducing material for gas pressure welding (not shown) having a fitting opening portion (not shown).

The usage method and the action of the reducing material for gas pressure welding after the fitting opening portion is formed in the cap body 3 are similar to those of the reducing material for gas pressure welding D1 described above, but are different in that the addition of the air blocking ring 33 and the reducing sheet 34 generates the action thereof.

In this case, in the pressure welding, the reducing material for gas pressure welding E3 is heated by the flame of the gas together with the materials to be pressure-welded 91, 92, whereby the reducing sheet 34 and the top plate 31 are first melted and burned. The reducing sheet 34 is then melted and burned in a very short time within a slight gap sandwiched between the pressure-welded surfaces 910, 920 of the materials to be pressure-welded 91, 92 inside the thermosetting resin air blocking ring 33 not yet melted.

The reducing sheet 34 is further vaporized by burning to rapidly increase in volume, whereby the air in the gap inside the air blocking ring 33 is pushed out to the outside at a high pressure, and oxygen in the air is combined with carbon of the polymer to become carbon dioxide gas, and oxidation on the pressure-welded surfaces is suppressed.

Further, while the air blocking ring 33 is not melted, the intrusion of the air into the gap inside the air blocking ring 33 is blocked. Combined therewith, oxidation within the gap is suppressed, and the formation of an oxide film on the tip surfaces on the pressure-welded side can be suppressed.

As just described, according to the reducing material for gas pressure welding E3, in the case of using natural gas, propane gas, hydrogen gas, or the like, which is inferior in thermal power to acetylene gas, in performing gas pressure welding, the formation of residue such as an oxide film and a metal residue on the pressure-welded surfaces 910, 920 can be suppressed even if heating is performed with a standard flame from the initial stage of heating so as to obtain sufficient thermal power, and pressure welding with sufficient strength can be performed.

Note that in the reducing material for gas pressure welding E3 as well, the reducing material for gas pressure welding E3 needs to be attached again when the reducing material for gas pressure welding E3 comes off before the gap between the pressure-welded surfaces 910, 920 of the respective materials to be pressure-welded is closed. At this time, the gap between the pressure-welded surfaces 910, 920 of the materials to be pressure-welded 91, 92 does not need to be greatly widened and adjusted, and the reducing material for gas pressure welding E3 can be attached simply by widening the gap to a gap having a width equal to the thickness of the top portion of the cap body 3 which is significantly thinner than the thickness of the entire cap body 3.

Further, the configuration in which the reducing material for gas pressure welding includes the air blocking ring and the reducing sheet as described in FIG. 17 can be similarly applied to the reducing materials for gas pressure welding A1, A2, A3, A4, A5, the reducing materials for gas pressure welding B1, B2, B3, the reducing materials for gas pressure welding C1, C2, the reducing materials for gas pressure welding D1, D2, the reducing materials for gas pressure welding E1, E2, and the reducing material for gas pressure welding F.

The terms and expressions used in the present description and the claims are only for the purpose of description and are not limiting, and there is no intention to exclude terms and expressions equivalent to the features and a part thereof described in the present description and the claims. It is obvious that various modifications can be made within the scope of the technical idea of the present invention.

The invention claimed is:

1. A reducing material for gas pressure welding comprising;

a cap body that can be externally fitted onto a tip portion of a material to be pressure-welded, wherein the cap body has a body portion, formed with an opening/closing part, that can be fitted around the material to be pressure-welded from a side surface so that a top portion of the cap body comes in contact with a tip surface of the material to be pressure-welded, the body portion is constituted of a plurality of side plates, and each of the plurality of side plates attaches to the top portion of the cap body, one of the plurality of side plates can swing, and the opening/closing part of the body portion can be opened and closed by swinging of the one of the plurality of side plates, and the plurality of side plates other than the one of the plurality of side plates are integrated in a circumferential direction.

2. A gas pressure welding method comprising the steps of:

attaching a reducing material for gas pressure welding having a cap body with a height larger than a predetermined gap to one material to be pressure-welded, whose tip surface is disposed facing a tip surface of an other material to be pressure-welded with the predetermined gap therebetween, by fitting the reducing material for gas pressure welding from a side surface of the one material to be pressure-welded so that a top portion of the cap body comes in contact with the tip surface of the one material to be pressure-welded; and with the cap body attached, sandwiching the top portion between the tip surfaces of the one material to be pressure-welded and the other material to be pressure-welded and heating them, wherein the cap body has a body portion, formed with an opening/closing part, that can be fitted around the one material to be pressure-welded from the side surface so that the top portion of the cap body comes in contact with the tip surface of the one material to be pressure-welded, the body portion is constituted of a plurality of side plates, and each of the plurality of side plates attaches to the top portion of the cap body, one of the plurality of side plates can swing, and the opening/closing part of the body portion can be opened and closed by swinging of the one of the plurality of side plates, and the plurality of side plates other than the one of the plurality of side plates are integrated in a circumferential direction.

* * * * *